US007543137B2

(12) United States Patent
Terai et al.

(10) Patent No.: US 7,543,137 B2
(45) Date of Patent: Jun. 2, 2009

(54) INFORMATION PROCESSING DEVICE AND INFORMATION PROCESSING METHOD

(75) Inventors: Junichi Terai, Takatsuki (JP); Yasunori Yamamoto, Takatsuki (JP); Keizo Sumida, Hirakata (JP); Yoshiteru Mino, Hirakata (JP); Yoshinori Tokimoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 485 days.

(21) Appl. No.: 11/388,972

(22) Filed: Mar. 27, 2006

(65) Prior Publication Data

US 2006/0224841 A1 Oct. 5, 2006

(30) Foreign Application Priority Data

Mar. 29, 2005 (JP) ............................ 2005-096191

(51) Int. Cl.
*G06F 9/00* (2006.01)
*G06F 9/24* (2006.01)
*G06F 13/00* (2006.01)

(52) U.S. Cl. .............................. 713/2; 713/1; 713/100; 711/147; 711/154

(58) Field of Classification Search .................... 713/2, 713/1, 100; 711/147, 154
See application file for complete search history.

(56) References Cited

U.S. PATENT DOCUMENTS 4,413,327 A * 11/1983 Sabo et al. .................. 711/162
4,591,976 A * 5/1986 Webber et al. ................ 714/20
4,654,819 A * 3/1987 Stiffler et al. ............... 711/162
5,884,074 A * 3/1999 Maeda et al. .................. 713/2
7,389,445 B2 * 6/2008 Yusa ........................... 714/30
2002/0073307 A1 * 6/2002 Bautz et al. ..................... 713/2
2003/0172261 A1 9/2003 Lee et al.
2004/0225928 A1 * 11/2004 Miyagi ........................ 714/54
2005/0144430 A1 6/2005 Yamamoto et al.
2005/0216723 A1 9/2005 Imamiya
2005/0223211 A1 10/2005 Sukegawa et al.
2005/0251672 A1 11/2005 Kim
2007/0033364 A1 * 2/2007 Maeda et al. ............... 711/170

FOREIGN PATENT DOCUMENTS

JP 2003-271391 9/2003

* cited by examiner

*Primary Examiner*—Thomas Lee
*Assistant Examiner*—Michael J Brown
(74) *Attorney, Agent, or Firm*—McDermott Will & Emery LLP

(57) ABSTRACT

An information processing device is provided in which a valid initial program is transferred to a RAM while avoiding a invalid block which is present in a low reliable storage device, such as a NAND-type flash memory or the like. A management information storing section 29 stores management information 30 indicating a position of a invalid block in a first storage device 31. When an information processing device 1 is powered on, a transfer determination section 20 is controlled to read a BSP 26 from a valid block of a first storage device 11 based on the management information 30, and transfer the BSP 26 to a second storage device 32. Thereby, it is possible to avoid reading of a invalid block present in the first storage device 31.

25 Claims, 34 Drawing Sheets

FIG. 4

BIT

| 7 | 6 | 5 | 4 | 3 | 2 | 1 | 0 | ADDRESS |
|---|---|---|---|---|---|---|---|---|
| 0 | 0 | 0 | 0 | 0 | 0 | 0 | 0 | 0 |
| 0 | 0 | 0 | 1 | 0 | 0 | 0 | 0 | 1 |
| 0 | 0 | 0 | 0 | 0 | 0 | 1 | 0 | 2 |
| 0 | 0 | 0 | 0 | 0 | 0 | 0 | 0 | 3 |
| ⋮ | | | | | | | | ⋮ |

| MANAGEMENT INFORMATION | A | B | C | D | E | F | G |
|---|---|---|---|---|---|---|---|
| 1 | LATEST | LATEST | LATEST | LATEST | LATEST | INVALID | PREVIOUS GENERATION |
| 2 | LATEST | LATEST | LATEST | PREVIOUS GENERATION | INVALID | PREVIOUS GENERATION | PREVIOUS GENERATION |
| 3 | LATEST | PREVIOUS GENERATION | INVALID | PREVIOUS GENERATION | PREVIOUS GENERATION | PREVIOUS GENERATION | PREVIOUS GENERATION |

INFORMATION PROCESSING DEVICE AND INFORMATION PROCESSING METHOD

BACKGROUND OF THE INVENTION

1. Field of the Invention

The present invention relates to an information processing device and an information processing method. More particularly, the present invention relates to an information processing device and an information processing method for performing a system boot by executing a program stored in a storage device, such as a NAND-type flash memory or the like, which has a possibility that a invalid block is originally included and a possibility that a invalid block occurs later.

2. Description of the Background Art

Flash memories can be roughly divided into NOR type and NAND type. The NOR-type flash memory has an advantage that it can be randomly accessed on a byte-by-byte basis, but has a disadvantage that it is expensive and its packaging density is low, as compared to the NAND-type flash memory.

On the other hand, the NAND-type flash memory is a memory in which invalid blocks are acceptable if the proportion of the invalid blocks is smaller than or equal to a predetermined value. Therefore, when data is written into or read from the NAND-type flash memory, the positions of invalid blocks need to be managed. In addition, the NAND-type flash memory can be accessed only sequentially, and an error detection/correction process is required after a read operation. Despite such a drawback, the NAND-type flash memory is advantageously inexpensive and advantageously has a high level of packaging density as compared to the NOR type flash memory.

There is a known information processing device which employs a NAND-type flash memory having such an advantage, as a storage device for storing an initial program which is executed during a system boot. In such a conventional information processing device, in order to execute a program stored in a low reliable memory, such as a NAND-type flash memory, initially, an interface section with respect to the low reliable memory in a system transfers the initial program from the low reliable memory to a RAM, and thereafter, releases resetting of a CPU of the system. Next, after release of resetting, the CPU transfers a main program from the low reliable memory to the RAM in accordance with the initial program. After completion of transfer of the main program, the CPU moves the process to the main program on the RAM, and thereafter, executes the main program on the RAM (e.g., Japanese Patent Laid-Open Publication No. 2003-271391 (p. 7, FIG. 2)).

In the above-described conventional information processing device, when the initial program is transferred from the NAND-type flash memory to the RAM during the system boot, it is not possible to avoid invalid blocks in the NAND-type flash memory.

Therefore, to avoid invalid blocks, data may be read from blocks storing the initial program on a block-by-block basis during the system boot, and while reading the data, it may be determined whether or not each block is a invalid block, using a check symbol for the block. In this case, a calculated check symbol is compared with an expected value of the check symbol, and when the calculated check symbol does not match the expected value, it is determined that the block thus checked is invalid.

However, when a invalid block is detected, a start-up process needs to be stopped or the initial program needs to be transferred again from another block, resulting in a deterioration in temporal efficiency.

Check symbols, such as ECC and the like, are not effective for an error having a predetermined number of bits or more. Therefore, when invalid data of the predetermined number of bits or more is present in a check unit, there may be a possibility that the invalid data is incorrectly determined as valid data. In this case, it is likely that a invalid initial program is transferred from the NAND-type flash memory to the RAM, and is executed by the CPU.

SUMMARY OF THE INVENTION

Therefore, an object of the present invention is to provide an information processing device and an information processing method which can transfer a valid initial program to a RAM while avoiding a invalid block(s) present in a low reliable storage device, such as a NAND-type flash memory or the like.

Another object of the present invention is to provide an information processing device and an information processing method which has management information which is highly reliable with respect to a invalid block(s) present in a storage device which stores an initial program, and can easily detect a defect in the management information itself.

Still another object of the present invention is to provide an information processing device and an information processing method which can reduce a time required to start up a system, and manufacturing cost.

A first aspect of the present invention is directed to an information processing device for performing a system boot using a program stored in a non-volatile storage device. The information processing device comprises a first storage device including a valid block and a invalid block and previously storing a program for performing a system boot in a non-volatile manner, a second storage device, a management information storing section storing management information indicating a position of the invalid block included in the first storage device in a non-volatile manner, a transfer device for transferring the program from the first storage device to the second storage device based on the stored management information, a CPU for performing a system boot by performing the program transferred by the second storage device, and a CPU control device for suppressing an operation of the CPU until the program is completely transferred by the transfer device.

A second aspect of the present invention is directed to an information processing method for an information processing device comprising a first storage device including a valid block and a invalid block and previously storing a program for performing a system boot in the valid block in a non-volatile manner, a second storage device, management information indicating a position of the invalid block present in the first storage device, and a CPU. The information processing method comprises a program transferring step including a transfer determining step of setting the valid block of the first storage device as a transfer source of the program based on the management information and a transferring step of transferring the program from the set transfer source to the second storage device, a CPU suppressing step of suppressing an operation of the CPU until the program transferring step is completed, and a system boot step in which the CPU executes the program transferred to the second storage device to perform a system boot.

According to the information processing device of the present invention, when an initial program is transferred before a system boot, management information about a invalid block(s) is used to avoid referencing the invalid block, thereby making it possible to perform a system boot with safety and quickly without reading or transferring a invalid initial program.

Further, management information can be provided in a low reliable memory, such as a NAND-type flash memory or the like, without using a highly reliable memory, such as a ROM or the like, thereby making it possible to reduce the cost of a system.

Furthermore, by detecting a defect which occurs in rewriting of management information, highly reliable management information can be used, thereby making it possible to start up a system with high probability.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating an exemplary format of management information in the information processing device of FIG. 1;

FIG. 15 is a diagram illustrating examples of first to third management information of FIG. 14;

DESCRIPTION OF THE PREFERRED EMBODIMENTS

First Embodiment

Figure 1:
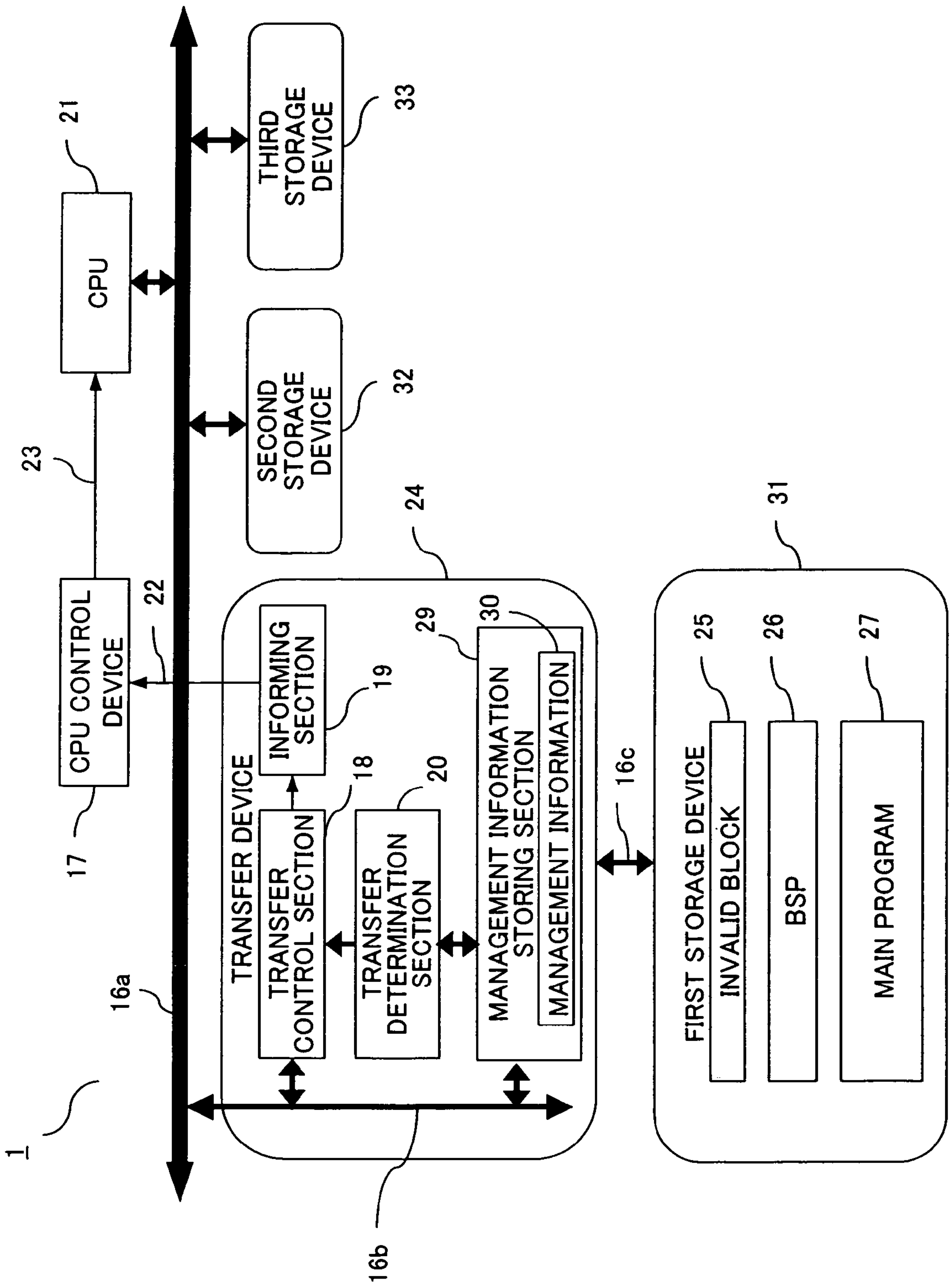
FIG. 1 is a block diagram illustrating a structure of an information processing device according to a first embodiment of the present invention.
Figure 2:
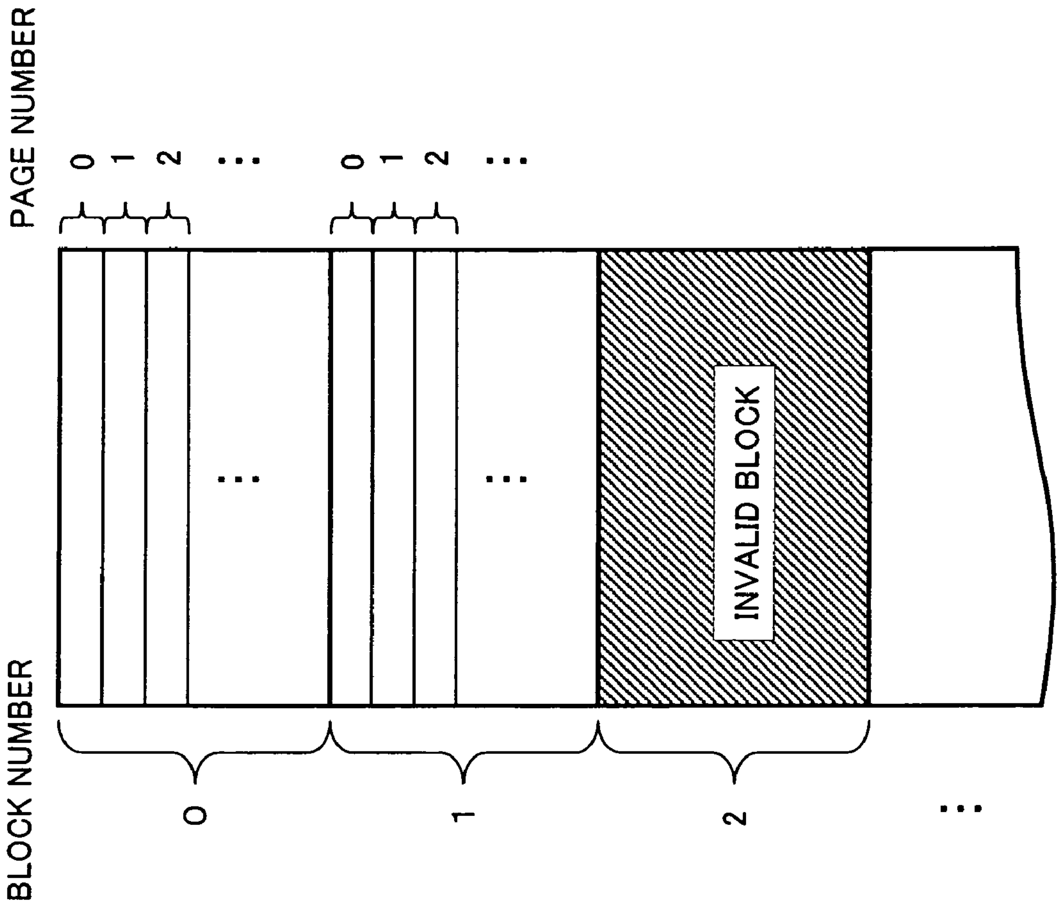
FIG. 2 is a diagram illustrating a relationship between blocks and pages in a NAND-type flash memory.
Figure 3:
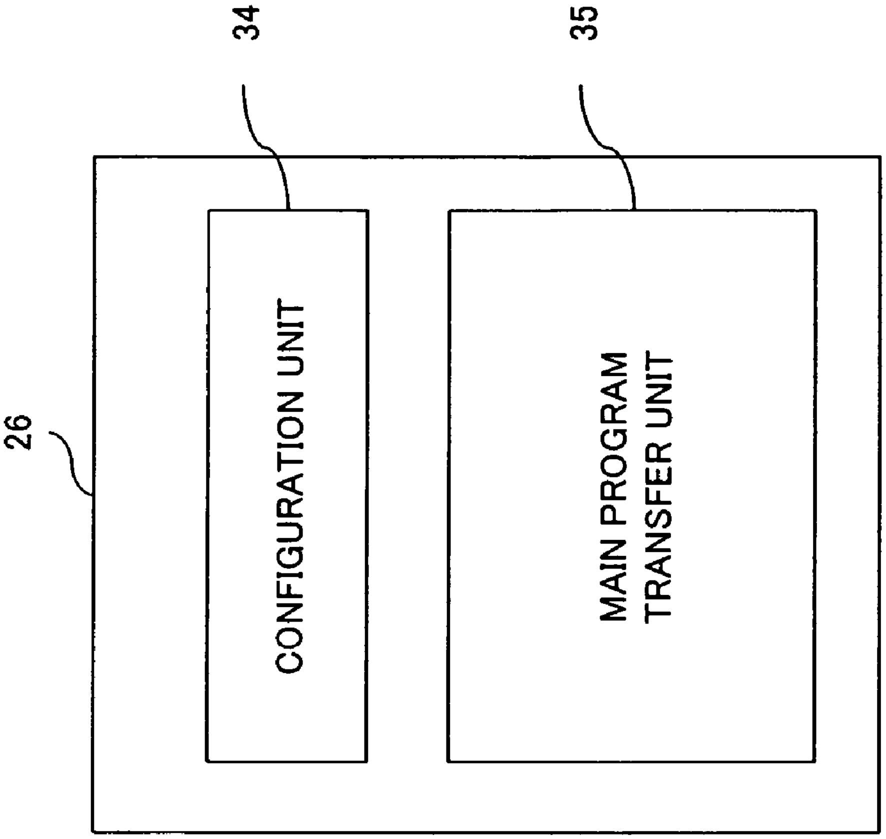
FIG. 3 is a block diagram illustrating a structure of a boot strap program (BSP) of FIG. 1.

FIG. 1 is a block diagram illustrating a structure of an information processing device according to a first embodiment of the present invention. FIG. 2 is a diagram illustrating a relationship between blocks and pages in a NAND-type flash memory. FIG. 3 is a block diagram illustrating a structure of a boot strap program (BSP) of FIG. 1. FIG. 4 is a diagram illustrating an exemplary format of management information in the information processing device of FIG. 1.

As illustrated in FIG. 1, the information processing device 1 comprises a CPU 21, a first storage device 31, a second storage device 32, a third storage device 33, a transfer device 24, and a CPU control device 17. These parts are connected to each other via data buses 16*a* to 16*c*.

The CPU 21 is a main CPU of the information processing device 1, and performs a system boot by executing a boot strap program 26 (hereinafter referred to as "BSP") which has been transferred from the first storage device 31 to the second storage device 32 by the transfer device 24.

The first storage device 31 is composed of a non-volatile storage device which contains a invalid block which does not normally function as a memory. In the first embodiment, a NAND-type flash memory is employed in the first storage device 31. This NAND-type flash memory has a storage area which is divided into a plurality of blocks, each of which is further divided into a plurality of pages, as illustrated in FIG. 2. For example, in a certain NAND-type flash memory, one block is composed of 8 pages, and one page is composed of a data area of 512 bytes and a redundant area of 16 bytes (a total of 528 bytes). Note that the page size and the block size vary depending on the type of the NAND-type flash memory, and therefore, one page may have a size other than 528 bytes and one block may have a size other than 8 pages. The first storage device 31 composed of the NAND-type flash memory contains a invalid block (block number 2) hatched in FIG. 2. Therefore, when a read or write operation is performed with respect to the first storage device 31, the read or write operation needs to be performed while avoiding the invalid block.

As illustrated in FIG. 1, the first storage device 31 stores the BSP 26 and a main program 27 in blocks other than a invalid block 25.

As illustrated in FIG. 3, the BSP 26 includes a configuration unit 34 and a main program transfer unit 35. The configuration unit 34 includes data required for basic configuration of a system, such as data for setting a bus controller and the like. When the BSP 26 is executed, setting of a memory controller for accessing the third storage device 33, or the like, is performed based on these pieces of data included in the configuration unit 34. The main program transfer unit 35 includes a routine for transferring the main program 27 to the third storage device 33. The main program 27 is a program which is executed by the CPU 21 after completion of the system boot. Generally, in information processing devices, the main program 27 has a size larger than that of the BSP 26.

Note that it can be determined whether a block included in the first storage device 31 is valid or invalid, by accessing the first storage device 31 using a predetermined method, before a write operation is performed with respect to the first storage device 31. When a write operation is performed with respect to the first storage device 31, the write operation needs to be performed only with respect to a valid block while avoiding the invalid block 25. Hereinafter, it is assumed that the BSP 26 is stored in one or more consecutive blocks having smallest block numbers of valid blocks included in the first storage device 31 (in consecutive pages from the first page), and the main program 27 is stored in one or more consecutive blocks (in consecutive pages from the first page) after the blocks storing the BSP 26 of the valid blocks included in the first storage device 31.

The second storage device 32 is a volatile memory which can be accessed by both the CPU 21 and the transfer device 24, without particular initial settings. The BSP 26 to be executed by the CPU 21 is transferred to the second storage device 32. Therefore, the second storage device 32 is composed of a memory having a capacity which has a size larger than that of the BSP 26. Note that, when the CPU 21 has completed execution of the BSP 26 transferred to the second storage device 32, the second storage device 32 loses its role. Therefore, the second storage device 32 may be composed of, for example, a static RAM, which has already been incorporated in a system LSI instead of a dedicated memory. Such a second storage device 32 may be used to construct the information processing device 1.

The third storage device 33 is a storage device to which the main program 27 is transferred, and is composed of a memory which has a capacity larger than that of the second storage device 32. Therefore, it is desirable that the third storage device 33 be composed of a volatile storage device which permits random access and has an inexpensive price per bit. The third storage device 33 is composed of, for example, an SDRAM.

Although the second storage device 32 and the third storage device 33 are here assumed to be separate storage devices for the sake of simplicity, the second storage device 32 and the third storage device 33 may be separate storage areas allocated in a single storage device. In this case, after completion of the system boot, the storage area allocated as the second storage device 32 can be used as a working storage area.

As illustrated in FIG. 1, the transfer device 24 includes a transfer control section 18, a transfer determination section 20, a management information storing section 29, and an informing section 19. The transfer control section 18 has a function of automatically transferring the BSP 26 stored in the first storage device 31 to the second storage device 32 in control of the transfer determination section 20, and a function of reading the main program 27 stored in the first storage device 31 in control of the CPU 21.

Before transferring the BSP 26 from the first storage device 31 to the second storage device 32, the transfer determination section 20 performs a valid/invalid determination process with respect to a possible block which stores the BSP 26, based on a management information 30 stored in the management information storing section 29, and instructs the transfer control section 18 to transmit a block which is determined to be valid.

After the transfer of the BSP 26 is completed, the informing section 19 outputs a transfer completion informing signal 22, indicating that the transfer is completed, to the CPU control device 17.

The management information storing section 29 is a non-volatile storage area which can be accessed without particular initial settings before the BSP 26 is read out from the first storage device 31 by the transfer device 24. Preferably, the management information storing section 29 is composed of a non-volatile storage device which can be randomly read and has a small capacity so that it can be incorporated into a system LSI. For example, as the management information storing section 29, an FERAM (Ferroelectric Random Access Memory) can be used. Note that the management information storing section 29 may be rewritable and readable with respect to the CPU 21 in addition to the random read feature.

In the management information storing section 29, the management information 30 indicating a position of a invalid block(s) present in the first storage device 31 is stored. As illustrated in FIG. 4, the management information 30 stores information indicating whether each block included in the first storage device 31 is valid or invalid, using one bit per block.

For example, it is assumed that a NAND-type flash memory having a capacity of 256 Mbytes and a block size of 16 Kbytes is employed as the first storage device 31. In this case, the total number of blocks is 16K. Therefore, the management information storing section 29 requires an area of 16 Kbits, i.e., 2 Kbytes. Here, it is assumed that each bits of the management information 30 is set to be a value "0" in the case of a valid block, and a value "1" in the case of a invalid block. In this case, the example of the management information 30 of FIG. 4 indicates that a thirteenth (address: 1, bit: 4) block and an eighteenth (address: 2, bit: 1) block in the first storage device 31 are invalid blocks.

Although an exemplary format of the management information 30 has been described above, other formats may be used or additional information may be provided for the management information 30.

The CPU control device 17 outputs a CPU start-up control signal 23 based on the transfer completion informing signal 22 outputed from the informing section 19 in order to control command fetch of the CPU 21 during the time until the transfer device 24 completes transferring the BSP 26. For example, the CPU control device 17 passes a reset signal of the CPU 21 as it is until the transfer completion informing signal 22 becomes active, and during this time, the CPU 21 is stopped. When the transfer completion informing signal 22 becomes active, the CPU control device 17 masks the reset signal and the CPU 21 starts an operation. Such a function of the CPU control device 17 suppresses the command fetch of the CPU 21 until the transfer completion informing signal 22 becomes active.

Hereinafter, an operation of the transfer device 24 will be described in greater detail.

When power is switched on, the transfer device 24 calculates a position in the first storage device 31 at which the BSP 26 is stored, and determines whether a block at the calculated storage position is valid or invalid. When it is determined that the block at the calculated storage position is valid, the transfer device 24 reads the BSP 26 sequentially on a page-by-page basis and transfers the BSP 26 to the second storage device 32.

More specifically, when power is switched on, initially, the transfer determination section 20 references the management information 30 stored in the management information storing section 29 to determine whether the first block of the first storage device 31 is valid or invalid. When the first block of the first storage device 31 is a valid block, the transfer determination section 20 instructs the transfer control section 18 to transfer the first block.

Note that, when a plurality of blocks are referenced by the transfer control section 18, the transfer determination section 20 determines whether each block is valid or invalid. If the transfer determination section 20 determines that a block is invalid, the transfer determination section 20 stops the system boot or determines whether the next block is valid or invalid.

The transfer control section 18 reads a content stored in the first storage device 31 from the beginning, and transfters the BSP 26 to the second storage device 32. In this case, destination addresses of data in the second storage device 32 are successively determined using, as a first address, an address at which a command is first fetched by the CPU 21 when power is switched on. In this embodiment, the address at which a command is first fetched by the CPU 21 is set to be the first address of the second storage device 32.

Figure 5:
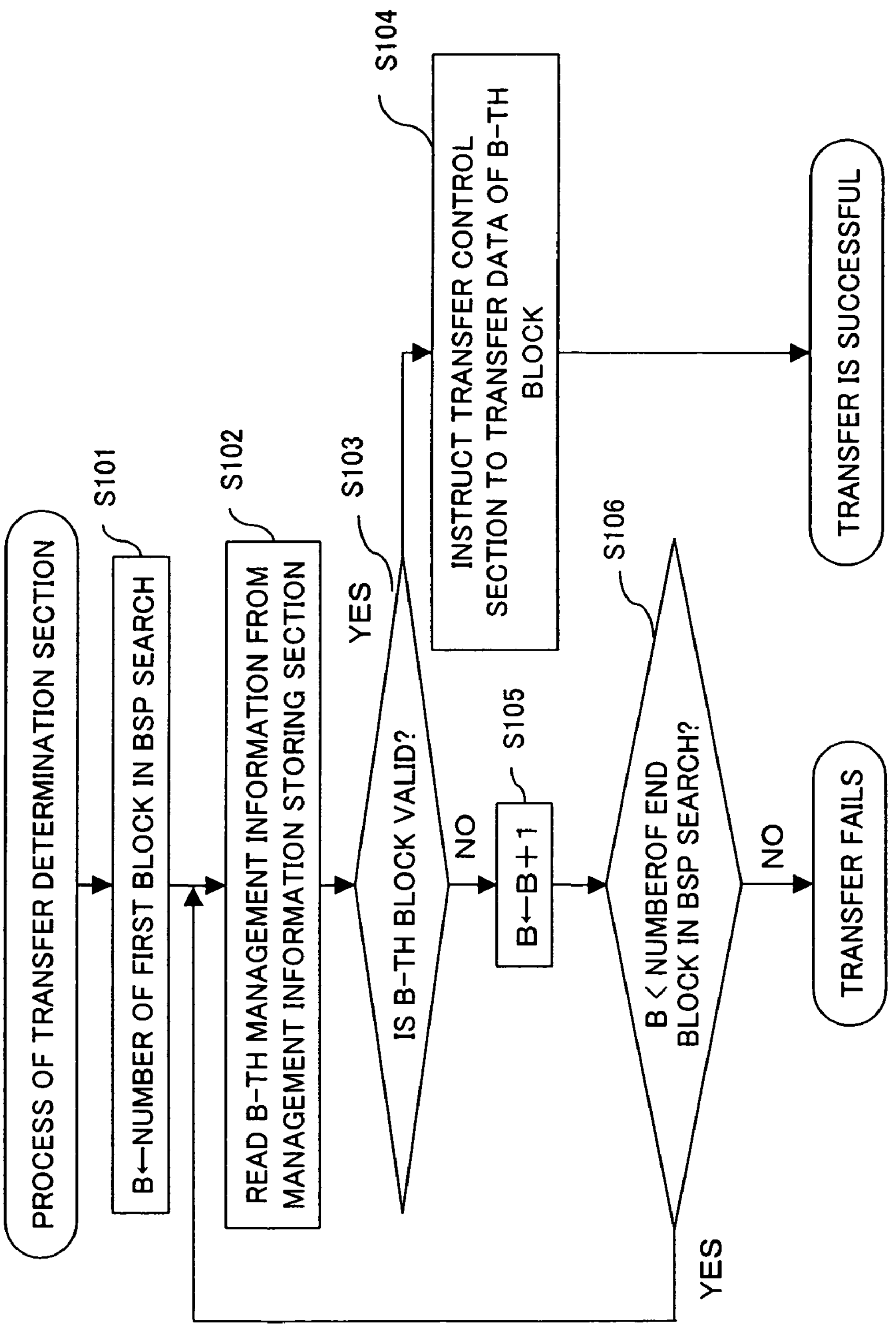
FIG. 5 is a flowchart illustrating an exemplary control process of a transfer determination section of FIG. 1.

FIG. 5 is a flowchart illustrating an exemplary control process of the transfer determination section 20. Note that, for sake of simplicity, it is here assumed that the size of a BSP is one block or less. In FIG. 5, a variable B indicates the number of a block from which the BSP is read out.

Referring to FIG. 5 in combination with FIG. 1, when power is switched on, initially, the transfer determination section 20 sets a number M of a first block in BSP search into the variable B (step S101). Thereby, a read start position in the first storage device 31 is set to be a first page in the first block.

Next, the transfer determination section 20 reads out management information corresponding to the B-th block of the management information 30 stored in the management information storing section 29 (step S102).

Next, the transfer determination section 20 determines whether or not the B-th management information thus read out is valid (step S103).

When the management information corresponding to the B-th block has a value indicating a valid block (YES in step S103), the transfer determination section 20 instructs the transfer control section 18 to transfer a content stored in the B-th block (step S104). When the transfer determination section 20 instructs the transfer control section 18 to transfer the stored content of the B-th block, the transfer control section 18 reads the stored content of the B-th block from the first storage device 31, and transfers the content to a predetermined address in the second storage device 32. In this case, the transfer of the BSP 26 is successful, and the transfer device 24 ends the process. The informing section 19 outputs the transfer completion informing signal 22 to the CPU control device 17.

On the other hand, when the management information corresponding to the B-th block has a value indicating a invalid block (No in step S103), the transfer determination section 20 adds “1” to the variable B (step S105), and thereafter, determines whether or not the variable B is smaller than a number N of an end block in the BSP search (step S106).

When B is smaller than N (Yes in step S106), the transfer determination section 20 returns to step S102 and repeats the above-described process. When B is not smaller than N (NO in step S106), the transfer of the BSP 26 fails, and the transfer determination section 20 ends the process.

With such a control, the transfer determination section 20 can search a maximum of (N-M) blocks for the BSP 26 while avoiding invalid block(s). Note that the values M (search start block) and N (search end block) may be predetermined values previously stored in the transfer device 24. The information processing device 1 may be configured so that the values M and N can be externally changed using a switch or the like.

Thereafter, as described above, when receiving the transfer completion informing signal 22 from the informing section 19, the CPU control device 17 recognizes that the transfer of the BSP 26 has been normally ended, and changes the CPU start-up control signal 23 so that the CPU 21 is enabled. In response to this, the CPU 21 starts command fetch from the second storage device 32. In contrast to this, when the transfer of the BSP 26 has not been normally completed, the informing section 19 does not output the transfer completion informing signal 22, so that the CPU start-up control signal 23 is not changed and the CPU 21 does not perform command fetch from the second storage device 32. Note that, as a method of controlling command fetch of the CPU 21 using the CPU control device 17, other methods may be used, such as a method of controlling a reset signal which is to be supplied to the CPU 21, a method of controlling a clock signal which is to be supplied to the CPU 21, and the like.

Figure 6:
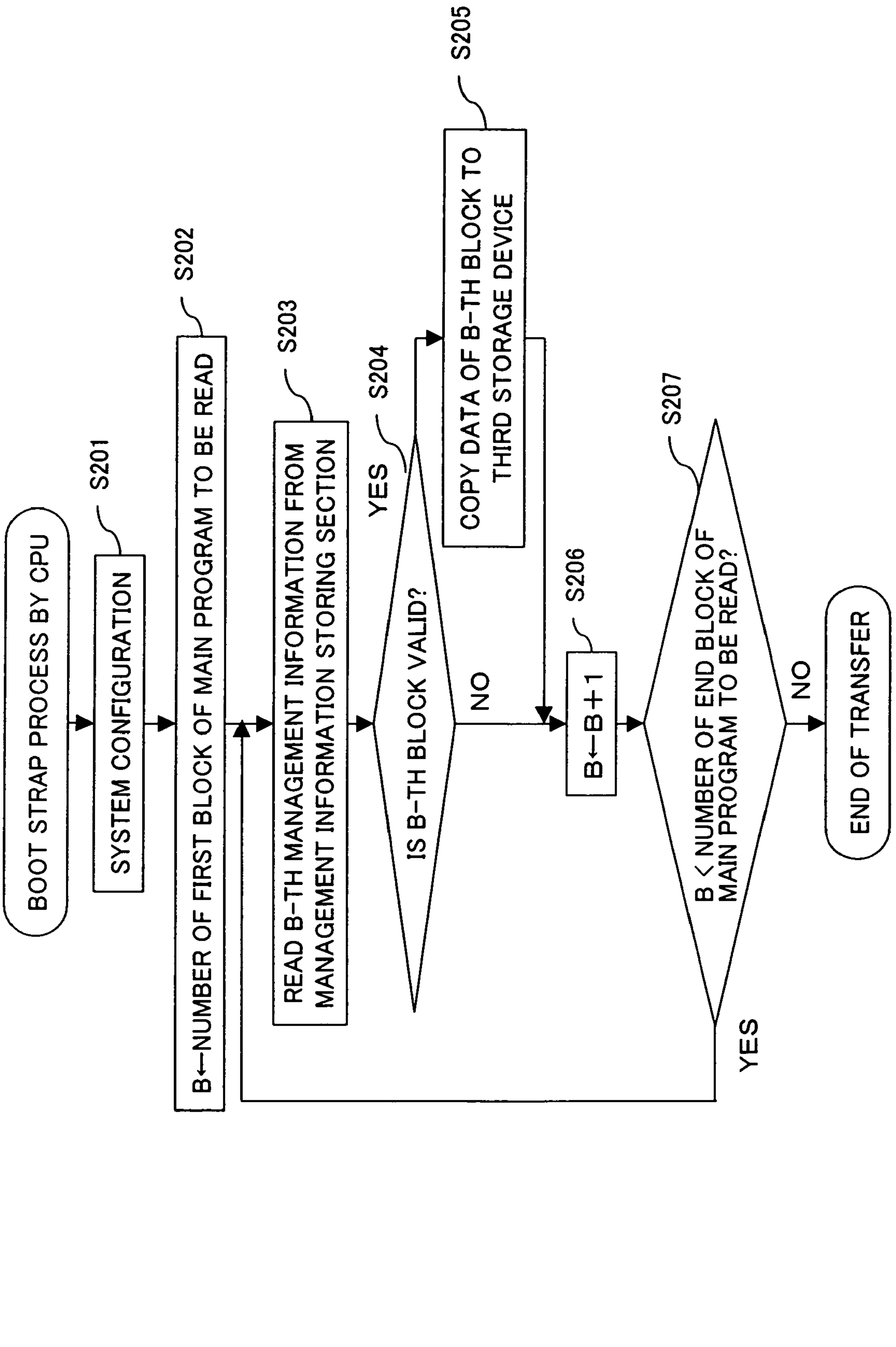
FIG. 6 is a flowchart illustrating an exemplary boot strap process performed by a CPU in the information processing device of FIG. 1.

FIG. 6 is a flowchart illustrating an exemplary boot strap process of the CPU 21. Note that, in FIG. 6, the variable B indicates a block number when a main program is read.

Referring to FIG. 6 in combination with FIG. 1, when the transfer of the BSP 26 to the second storage device 32 has been completed, the CPU 21 initially performs system configuration using data stored in a system configuration unit of the BSP 26 (step S201). Thereby, for example, various parameters for a memory interface circuit and the like are set, so that the CPU 21 can access the third storage device 33.

Next, the CPU 21 sets a first block number P of blocks from which the main program is to be read, into the variable B (step S202).

Next, the CPU 21 reads management information corresponding to the B-th block from the management information storing section 29 (step S203) to determine whether or not the B-th block is valid (step S204). When the B-th block is a valid block (YES in step S204), CPU 21 copies a content stored in the B-th block of the first storage device 31 to a predetermined address in the third storage device 33 (step S205), and adds "1" to the variable B (step S206). When the B-th block is a invalid block (NO in step S204), the CPU 21 does not execute step S205, and adds "1" to the variable B (step S206).

Thereafter, the CPU 21 determines whether or not the variable B is smaller than a number Q of an end block in main-program search (step S207).

When B is smaller than Q (YES in step S207), the CPU 21 returns to step S203 and repeats a similar process. When B is not smaller than Q (NO in step S207), the CPU 21 transfers the main program 27 and ends the process.

Thus, the CPU 21 executes the BSP 26 on the second storage device 32 with respect to a maximum of (Q-P) blocks while avoiding invalid block(s), thereby transferring the main program 27 of the first storage device 31 to the third storage device 33. Thereafter, the CPU 21 executes the main program 27 on the third storage device 33.

As described above, according to the information processing device 1, even when a low reliable memory, such as a NAND-type flash memory or the like, is employed as the first storage device 31, the transfer device 24 can transfer a program stored in the first storage device 31 based on the management information 30 indicating the position of a invalid block(s) present in the first storage device 31, while avoiding the invalid block(s). Thereby, the CPU 21 can stably perform a system boot.

In the information processing device 1 of this embodiment, it is not necessary to read a invalid block and calculate or compare check symbols, so that a time required for a system boot can be reduced. In addition, it is possible to avoid inappropriate transfer of a invalid block which cannot be detected using a check symbol.

Particularly, in this embodiment, the transfer device 24 includes the management information 30, so that the transfer device 24 does not need to access other memories. Therefore, the transfer device 24 can be composed of a simple circuit.

Second Embodiment

Figure 7:
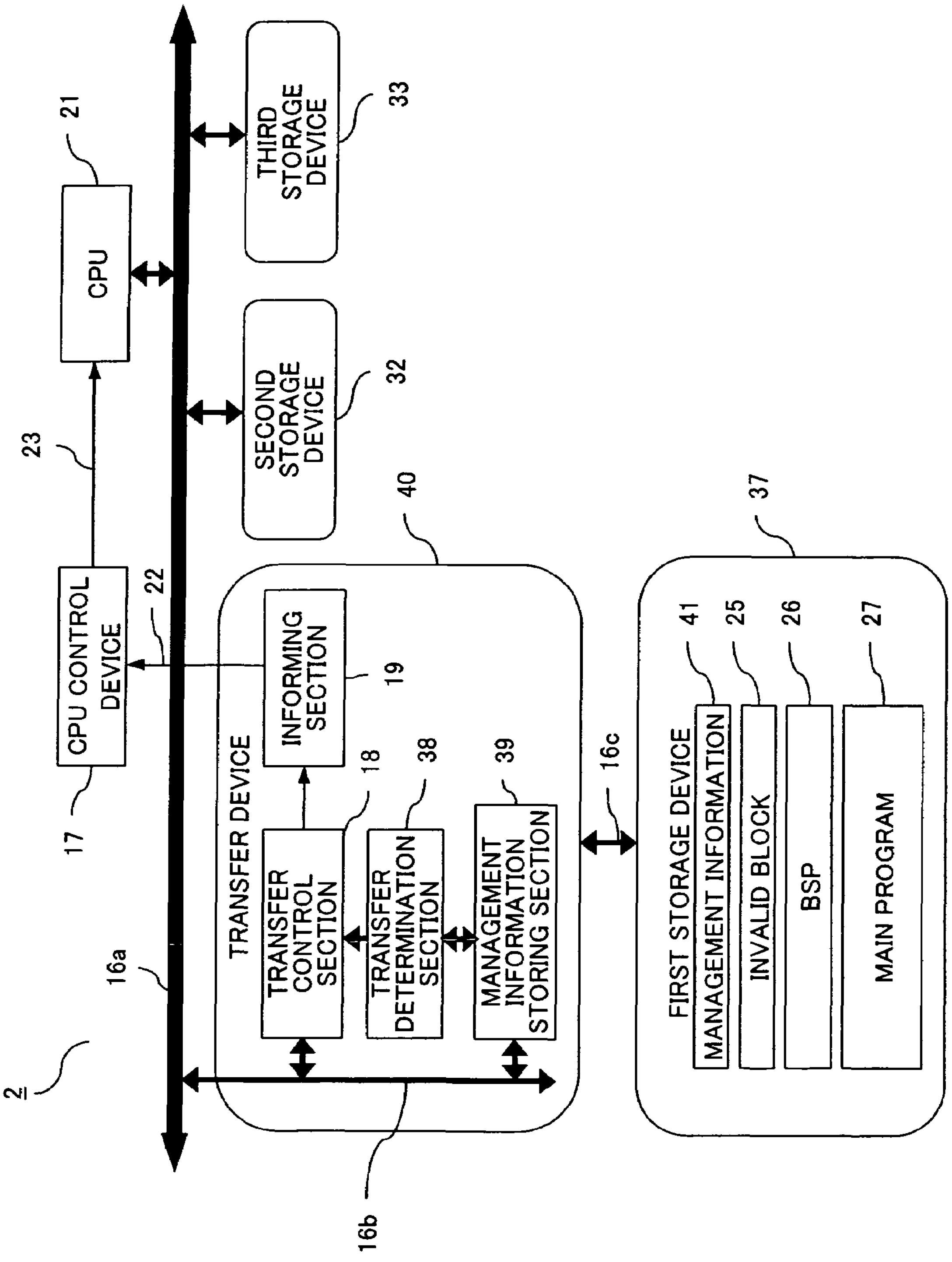
FIG. 7 is a block diagram illustrating a structure of an information processing device according to a second embodiment of the present invention.

FIG. 7 is a block diagram illustrating a structure of an information processing device according to a second embodiment of the present invention. The information processing device 2 of the second embodiment has a basic structure similar to that of the first embodiment, and therefore, differences therebetween will be hereinafter mainly described.

Firstly, the information processing device 2 of the second embodiment is different from that of the first embodiment in that management information 41 indicating a position of a invalid block(s) present in a first storage device 37 is stored in a predetermined valid block of the first storage device 37. Another difference from the first embodiment is that a management information obtaining section 39 which obtains the management information 41 from the first storage device 37 is further included in a transfer device 40.

Figure 8:
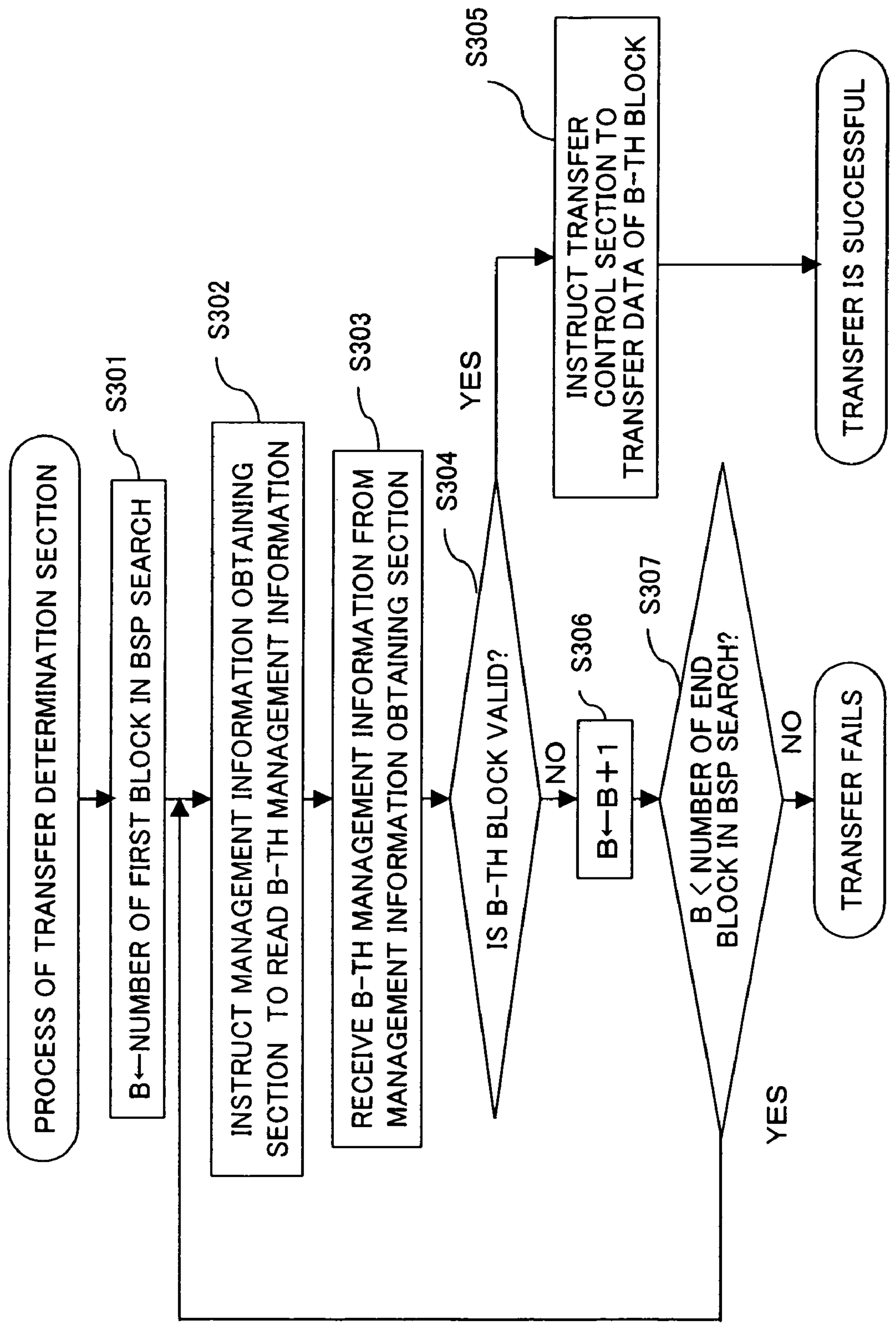
FIG. 8 is a flowchart illustrating an exemplary control process of a transfer determination section of FIG. 7.

FIG. 8 is a flowchart illustrating an exemplary control process of a transfer determination section 38. Note that, also in FIG. 8, the size of the BSP 26 is one block or less.

Referring to FIG. 8 in combination with FIG. 7, when power is switched on, the transfer determination section 38 sets a number M of a first block in BSP search into a variable B (step S301). Thereby, a read start position in the first storage device 37 is set to be a first page of the first block.

Next, the transfer determination section 38 instructs the management information obtaining section 39 to read the management information 41 (step S302).

Next, when receiving the management information 41 from the management information obtaining section 39 (step S303), the transfer determination section 38 reads data corresponding to a B-th block from the management information 41 and determines whether or not the B-th block is valid (step S304).

When management information corresponding to the B-th block has a value indicating a valid block (YES in step S304), the transfer determination section 38 instructs the transfer control section 18 to transfer a content stored in the B-th block (step S305). When the transfer determination section 38 instructs the transfer control section 18 to transfer the stored content of the B-th block, the transfer control section 18 reads out the stored content of the B-th block of the first storage device 37, and transfers the content to a predetermined address in the second storage device 32. In this case, transfer of the BSP 26 is successful, and the transfer device 40 ends the process. The informing section 19 outputs the transfer completion informing signal 22 to the CPU control device 17.

On the other hand, when the management information corresponding to the B-th block has a value indicating a invalid block (NO in step S304), the transfer determination section 38 adds "1" to the variable B (step S306).

Thereafter, the transfer determination section 38 determines whether or not the variable B is smaller than a number N of an end block in the BSP search (step S307).

When B is smaller than N (YES instep S307), the transfer determination section 38 returns to step S302 and repeats a process similar to that which is described above. When B is not smaller than N (NO in step S307), the transfer determination section 38 assumes that the transfer of the BSP 26 failed, and ends the process.

Thus, the transfer determination section 38 searches a maximum of (N-M) blocks for the BSP 26 while avoiding invalid block(s). Note that the above-described values M and N may be predetermined values stored in the transfer device 40. Alternatively, the information processing device 2 may be configured so that the values M and N can be externally changed using a switch or the like. Although the management information obtaining section 39 is configured to obtain the whole management information 41 in the second embodiment, only the management information corresponding to the B-th block may be obtained.

Subsequently, the information processing device 2 performs the subsequent process in a manner similar to that of the first embodiment, and therefore, can achieve an effect similar to that of the first embodiment. In addition, in the information processing device 2 of the second embodiment, the management information 41 is stored in the first storage device 37, so that the transfer device 40 does not need to include a non-volatile storage device for storing management information. Thereby, it is possible to reduce the cost of the system.

Third Embodiment

Figure 9:
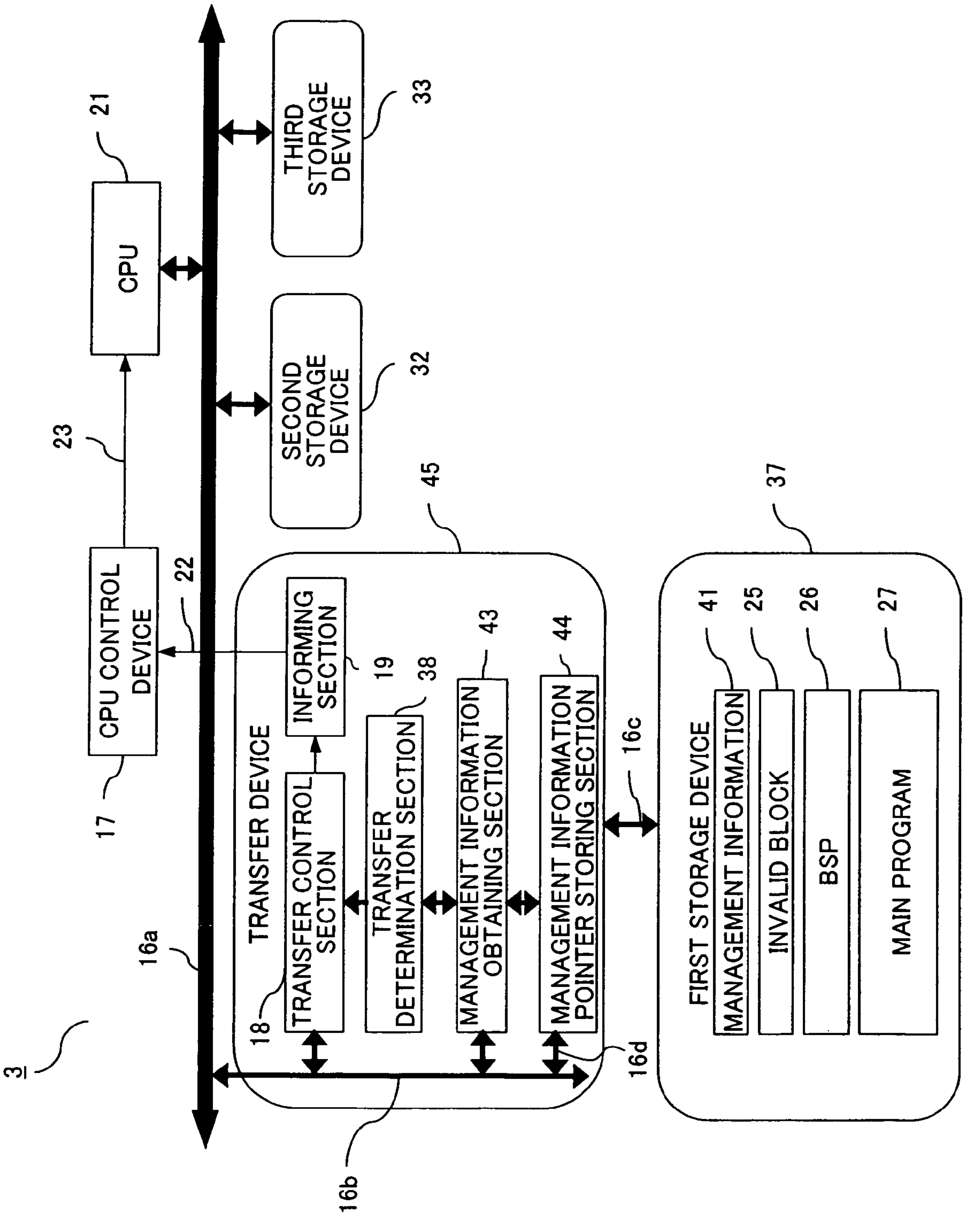
FIG. 9 is a block diagram illustrating a structure of an information processing device according to a third embodiment of the present invention.

FIG. 9 is a block diagram illustrating a structure of an information processing device according to a third embodiment of the present invention. The information processing device 3 of the third embodiment has a basic structure similar to that of the second embodiment (FIG. 7); and is different from that of the second embodiment in that a transfer device 45 further includes a management information pointer storing section 44.

The management information pointer storing section 44 is composed of a non-volatile storage device. The transfer device 45 is configured so that the CPU 21 can write data into the management information pointer storing section 44 via a data bus 16*d*. The management information pointer storing section 44 stores an address of the management information 41 held in the first storage device 37 as a management information pointer. A value used as the management information pointer is not particularly limited, and for example, may be a number of a block of the first storage device 37 in which the management information 41 is stored.

When obtaining the management information 41, a management information obtaining section 43 references a management information pointer stored in the management information pointer storing section 44 to specify a storage position of the management information 41. The management information pointer storing section 44 is configured to be updated in association with writing of the management information 41 by the CPU 21.

With the above-described configuration, the management information 41 itself is stored in the first storage device 37, and only positional information of the management information 41 is stored in the management information pointer storing section 44 composed of a non-volatile storage device, thereby making it possible to reduce the capacity of the non-volatile storage device required for the transfer device 45. For example, when the first storage device 37 is composed of 2048 blocks, a non-volatile storage device having a capacity of 2048 bits is required to store the whole management information 41 into the transfer device 45. However, when only a management information pointer is stored, only 11 bits are required, for example. Thereby, it is possible to reduce the cost of the system.

Even when a block storing the management information 41 becomes a invalid block later, it is possible to prevent the system from being disabled, since the management information 41 can be easily moved to a valid block.

In addition, if the transfer device 45 is configured so that the CPU 21 can rewrite a management information pointer which is positional information of the management information 41, the CPU 21 can rewrite the management information pointer in association with writing of the management information 41. In this case, if the management information pointer storing section 44 is controlled to be updated in association with writing of the management information 41 by the CPU 21, it is possible to prevent a management information pointer, which is positional information, from failing to be updated.

Fourth Embodiment

Figure 10:
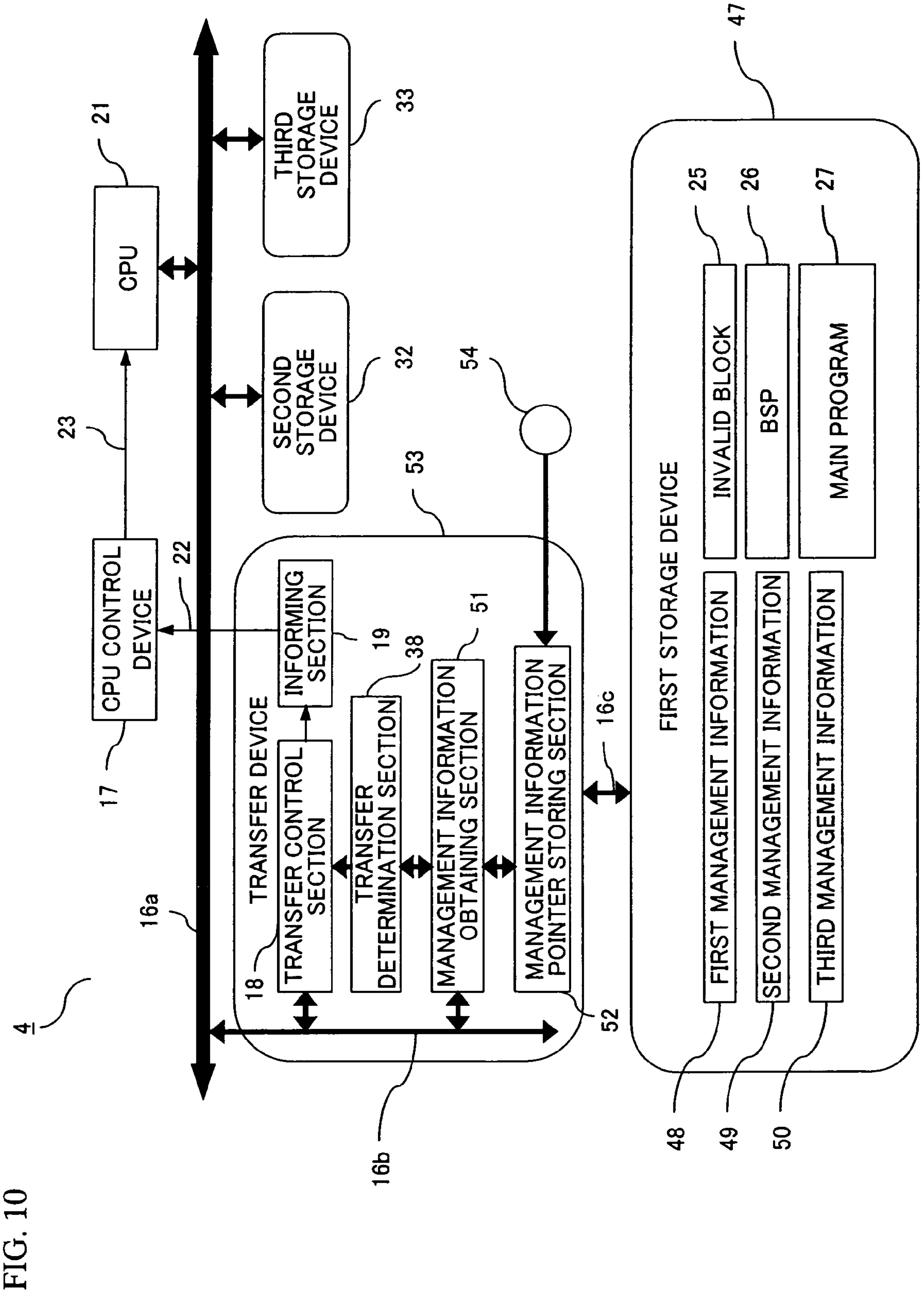
FIG. 10 is a block diagram illustrating a structure of an information processing device according to a fourth embodiment of the present invention.

FIG. 10 is a block diagram illustrating a structure of an information processing device according to a fourth embodiment of the present invention. The information processing device 4 of the fourth embodiment has a basic structure similar to that of the second embodiment (FIG. 7), and is different from that of the second embodiment in that a first storage device 47 stores first to third management information 48 to 50, the information processing device 4 further includes a management information selecting terminal 54, an a transfer device 53 includes a management information pointer calculating section 52.

For example, the first to third management information 48 to 50 hold the same value, and are stored in respective different valid blocks in the first storage device 47. With such a configuration, when any of the pieces of management information becomes invalid later, the other pieces of management information can be used for backing up.

The management information selecting terminal 54 is a terminal for externally receiving selection information for selecting management information.

The management information pointer calculating section 52 calculates a management information pointer which is to be provided to a management information obtaining section 51, depending on a value of the selection information input from the management information selecting terminal 54. The value inputed to the management information selecting terminal 54 is not particularly limited, and may be a value with which each piece of management information can be identified.

In an initial state, a value specifying the first management information 48 is set in the management information selecting terminal 54. When a system boot fails using the first management information 48, the user switches a value of the management information selecting terminal 54 to a value specifying second management information 49, and performs a system boot again.

With such a configuration, even when a block storing any piece of management information is damaged, the information processing device 4 can switch to another piece of management information to try a boot again. In addition, since the management information pointer calculating section 52 calculates positional information based on input selection information, the management information selecting terminal 54 can be configured using a small number of bits, thereby making it possible to reduce the cost of the system.

Although the case where three pieces of management information are included in the first storage device 47 has been described above, the number of pieces of management information does not necessarily need to be three, and may be any number of two or more. As a variation, the information processing device 4 may be configured so that the management information pointer calculating section 52 is eliminated from the transfer device 53, and the selection information inputted from the management information selecting terminal 54 is directly input to the management information obtaining section 51. In addition, storage position information of the first to third management information 48 to 50 may be directly inputted to the management information selecting terminal 54.

Fifth Embodiment

Figure 11:
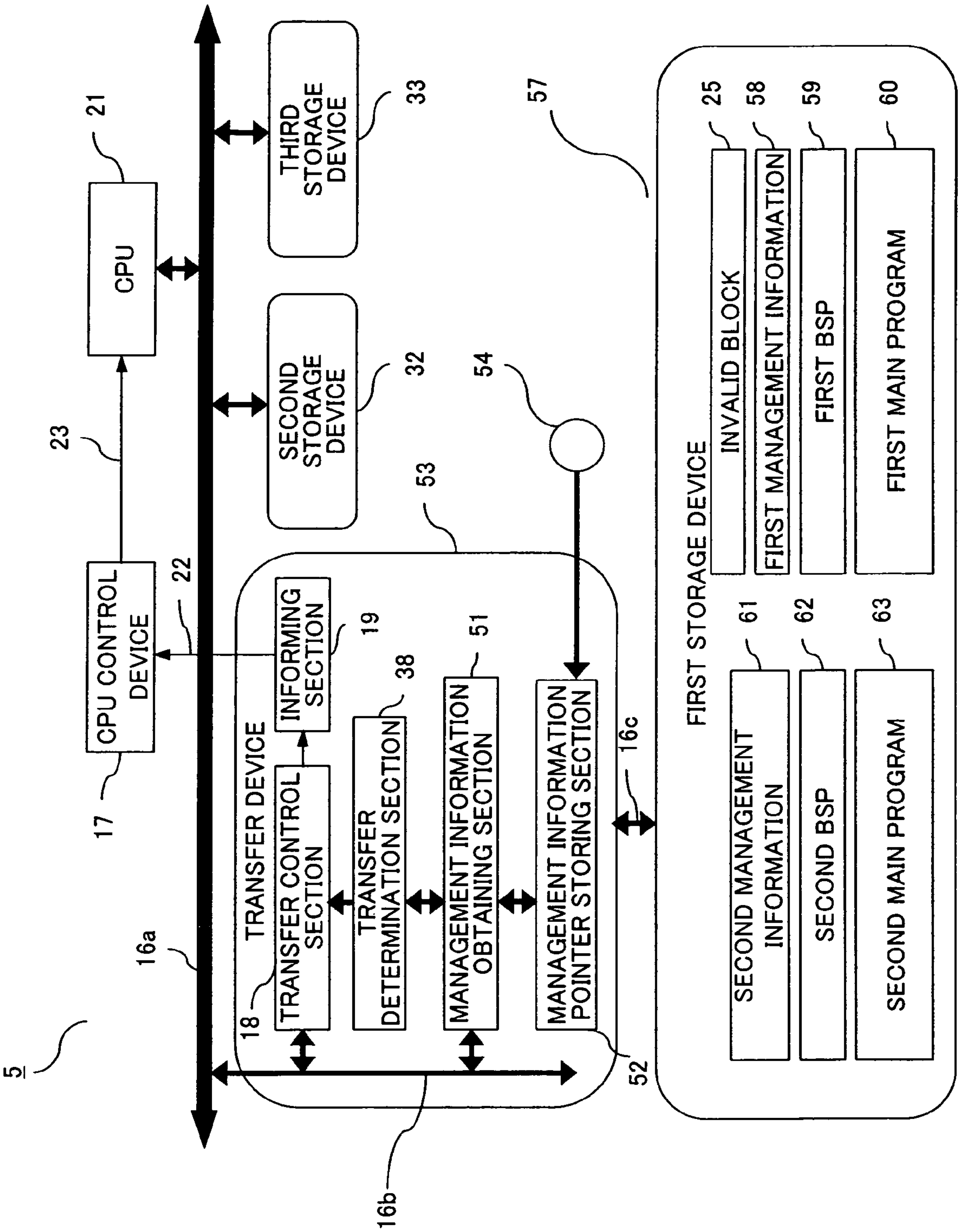
FIG. 11 is a block diagram illustrating a structure of an information processing device according to a fifth embodiment of the present invention.

FIG. 11 is a block diagram illustrating a structure of an information processing device according to a fifth embodiment of the present invention. The information processing device 5 of the fifth embodiment has a basic structure similar to that of the fourth embodiment (FIG. 10), and is significantly different from that of the fourth embodiment in a program stored in a first storage device 57, and the like.

As illustrated in FIG. 11, the first storage device 57 stores first management information 58, a first BSP 59, a first main program 60, second management information 61, a second BSP 62, and a second main program 63. Note that, in the fifth embodiment, the first main program 60 is a program different from the second main program 63.

In the first management information 58, blocks in which the first management information 58, the first BSP 59, and the first main program 60 are stored are registered as valid blocks, and blocks in which the second management information 61, the second BSP 62, and the second main program 63 are stored are registered as invalid blocks.

Conversely, in the second management information 61, blocks in which the second management information 61, the second BSP 62, and the second main program 63 are stored are registered as valid blocks, and blocks in which the first management information 58, the first BSP 59, and the first main program 60 are stored are registered as invalid blocks.

The first BSP 59 includes information for transferring the first main program 60 from the first storage device 57 to the third storage device 33. The second BSP 62 includes information for transferring the second main program 63 from the first storage device 57 to the third storage device 33.

With such a configuration, when the first management information 58 is selected via the management information selecting terminal 54, the first main program 60 can be started up, and when the second management information 61 is selected, the second main program 63 can be started up. Therefore, different programs can be externally selected and started up via the management information selecting terminal 54 as required.

Although the information processing device 5 includes a pair of pieces of management information, a pair of BSPs, and a pair of main programs in the fifth embodiment, three or more pieces of management information, three or more BSPs, and three or more main programs may be provided.

Sixth Embodiment

Figure 12:
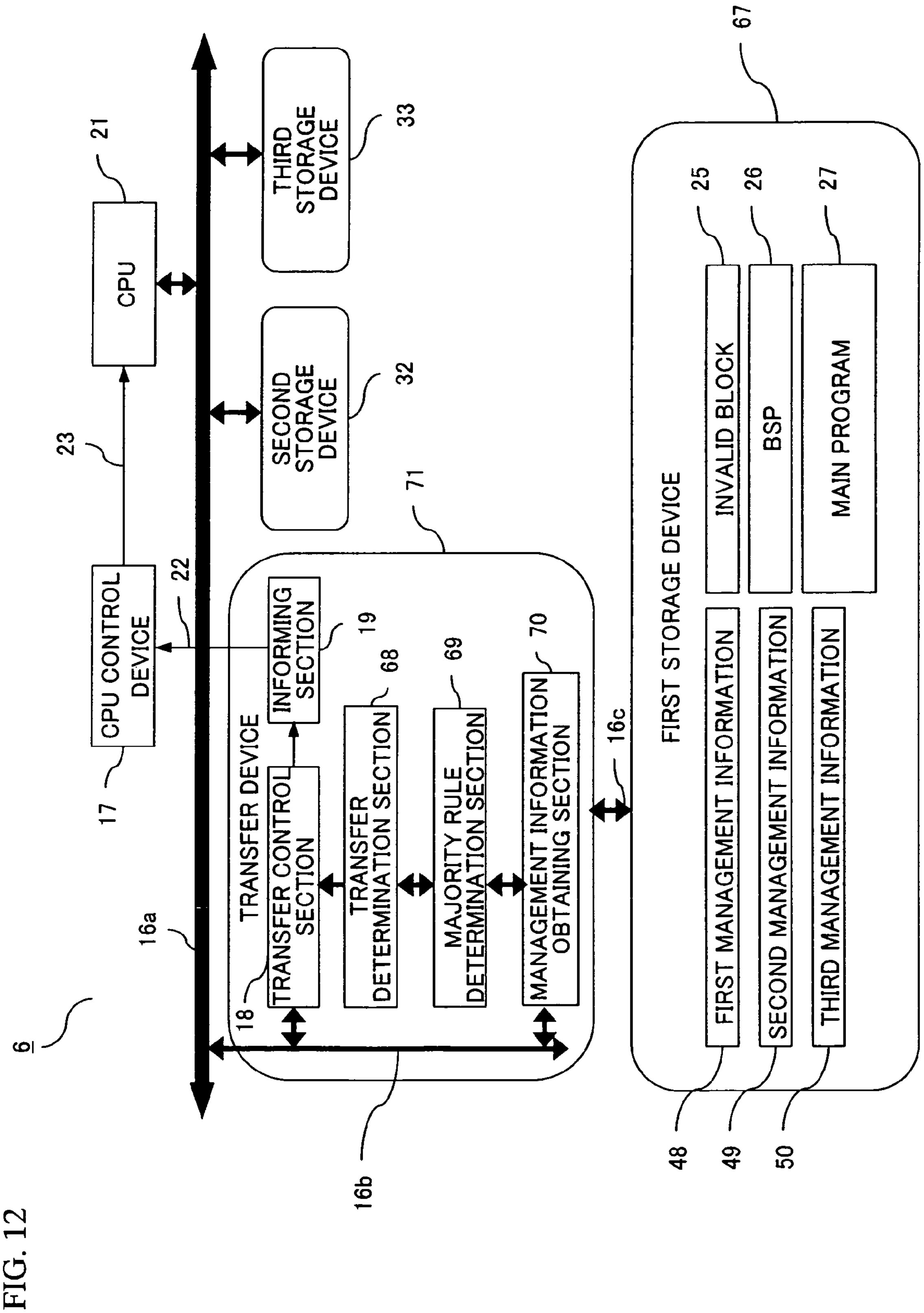
FIG. 12 is a block diagram illustrating a structure of an information processing device according to a sixth embodiment of the present invention.

FIG. 12 is a block diagram illustrating a structure of an information processing device according to a sixth embodiment of the present invention. The information processing device 6 of the sixth embodiment has a basic structure similar to that of the second embodiment (FIG. 7), and is different from that of the second embodiment in that first to third management information 48 to 50 are stored in a first storage device 67, and a transfer device 71 further includes a majority rule determination section 69.

The first to third management information 48 to 50 hold the same data. A storage position of each piece of management information may be fixed, or freely changed as in the second embodiment, in the first storage device 67. Although the first storage device 67 stores three pieces of management information in the sixth embodiment, the number of pieces of management information does not necessarily need to be three and may be any number of two or more.

The majority rule determination section 69 selects a majority value from a plurality of pieces of management information with respect to a certain block based on majority rule, and provides the selected management information to a transfer determination section 68. When management information of a certain block is referenced from the transfer determination section 68, the majority rule determination section 69 initially reads each of the first management information 48, the second management information 49, and the third management information 50 with respect to the block. Next, based on the read pieces of management information, the majority rule determination section 69 counts the number of pieces of management information indicating a valid block and the number of pieces of management information indicating a invalid block. As a result, when the number of pieces of management information indicating a valid block is larger than the number of pieces of management information indicating a invalid block, the majority rule determination section 69 returns information that the reference block is a valid block, to the transfer determination section 68. When the number of pieces of management information indicating a valid block is smaller than or equal to the number of pieces of management information indicating a invalid block, the majority rule determination section 69 returns information that the referenced block is a invalid block, to the transfer determination section 68.

Figure 13:
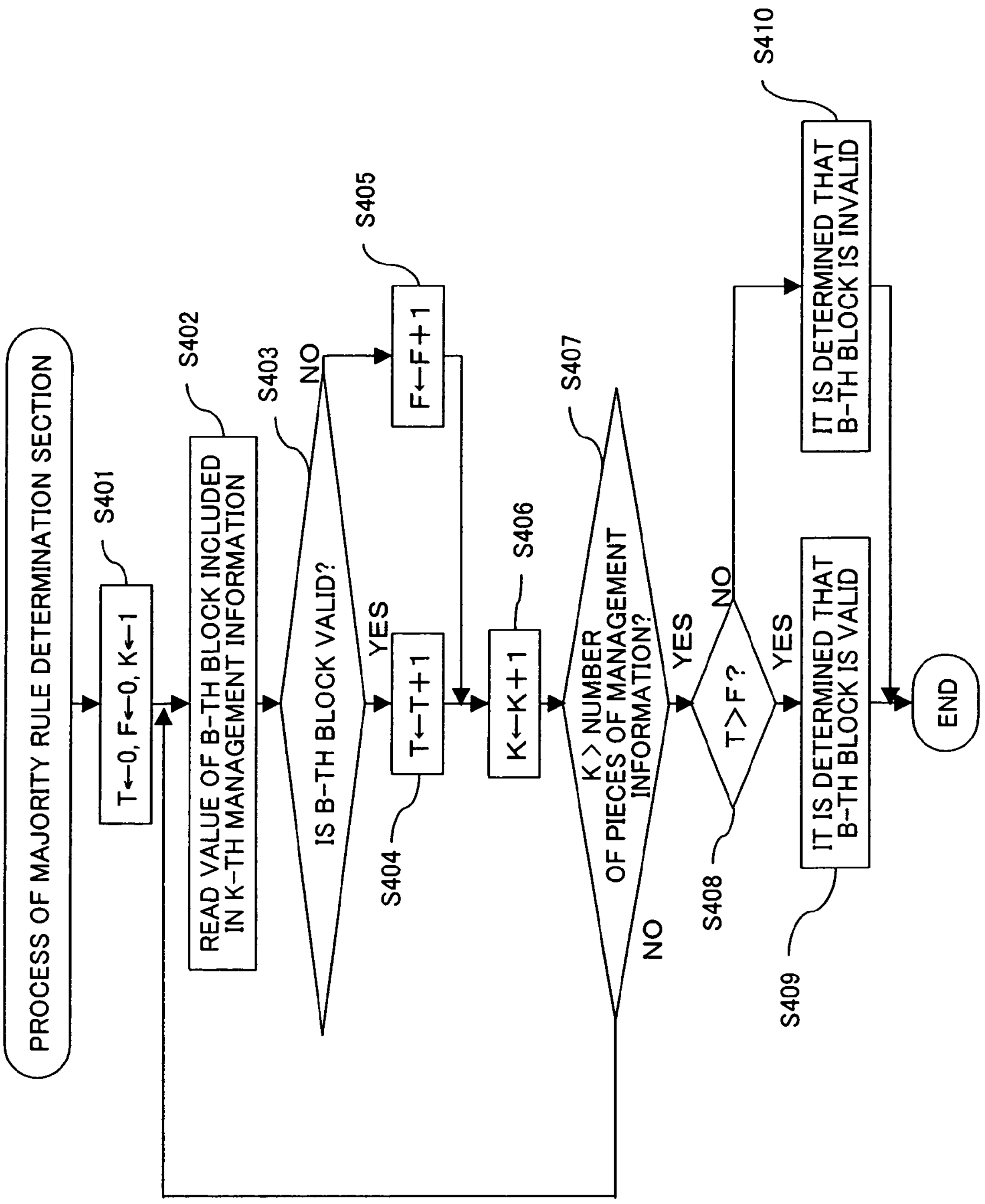
FIG. 13 is a flowchart illustrating an exemplary control process of a majority rule determination section of FIG. 12.

FIG. 13 is a flowchart illustrating an exemplary control process of the majority rule determination section 69. Referring to FIG. 13 in combination with FIG. 12, when management information of the B-th block is referenced from the transfer determination section 68, the majority rule determination section 69 initializes, with "0", a variable T holding the number of pieces of management information indicating a valid block and a variable F indicating the number of pieces of management information indicating a invalid block, and initializes, with "1", a variable K holding the number of pieces of the read management information (step S401).

Next, the majority rule determination section 69 reads a value of management information corresponding to the B-th block from K-th management information via a management information obtaining section 70 (step S402).

Next, the majority rule determination section 69 determines whether or not the B-th block is a valid block, based on the management information value read in step S402 (step S403). When the B-th block is a valid block (YES in step S403), the majority rule determination section 69 adds "1" to the variable T (step S404). When the B-th block is a invalid block (NO in step S403), the majority rule determination section 69 adds "1" to the variable F (step S405).

Next, the majority rule determination section 69 adds "1" to the variable K (step S406), and thereafter, determines whether or not the number K of pieces of the read management information is larger than the stored number of pieces of management information (step S407). When K is not larger than the stored management information number, not all of the plurality of pieces of management information have been referenced, and therefore, the majority rule determination section 69 returns to step S402 and repeats the above-described process.

When K is larger than the stored management information number (YES in step S407), the majority rule determination section 69 compares the variable T with the variable F (step S408). When the variable T is larger than the variable F (YES in step. S408), i.e., a majority in the plurality of pieces of management information has a value indicating a valid block, the majority rule determination section 69 determines that the B-th block is a valid block (step S409). When the variable T is not larger than the variable F (NO in step S408), i.e., half or more of the plurality of pieces of management information have a value indicating a invalid block, the majority rule determination section 69 determines that the B-th block is a invalid block (step S410). After selecting the management information value based on majority rule, the majority rule determination section 69 returns the selected management information to the transfer determination section 6, and ends the process.

With such a configuration, the majority rule determination section 69 can select the values of the first to third management information 48 to 50 stored in the first storage device 67 based on majority rule by performing a relatively simple process. Thereby, even when the first storage device 67 suddenly breaks down, the reliability of management information can be secured.

Although the majority rule determination section 69 is configured to reference all of a plurality of pieces of management information in the sixth embodiment, the majority rule determination section 69 may end the management information selecting process based on majority rule at the time when a value holding the majority of the total number of pieces of management information is first detected. With such a configuration, the majority rule determination section 69 can end the majority rule determination process early, whereby the time required for a system boot can be reduced.

Alternatively, when the first to third management information 48 to 50 are stored into the first storage device 67, each piece of the first to third management information 48 to 50 may be stored while performing cyclic shift by a predetermined number of bits. In this case, the majority rule determination section 69 may reference the first-to third management information 48 to 50 while performing cyclic shift by a predetermined number of bits in a direction opposite to that when they are stored.

For example, when cyclic shift is performed to the right in units of 5 bits, the first management information 48 may be stored without shift, the second management information 49 may be cyclic-shifted by 5 bits to the right with respect to the original value, and the third management information 50 may be cyclic-shifted by 10 bits to the right with respect to the original value. When a read operation is performed, the majority rule determination section 69 may reference the first management information 48 without shift, the second management information 49 after cyclic shift by 5 bits to the left, and the third management information 50 after cyclic shift by 10 bits to the left.

Generally, in NAND-type flash memories, it is structurally likely that contiguous address bits in the same column break down over different pages. However, with the above-described configuration, a plurality of pieces of management information are stored in different column addresses, whereby the possibility that all pieces of management information are simultaneously lost is reduced. If a portion of the pieces of management information is lost, the process of the majority rule determination section 69 backs up the lost information, thereby making it possible to further improve the reliability against the failure of the NAND-type flash memory.

Seventh Embodiment

Figure 14:
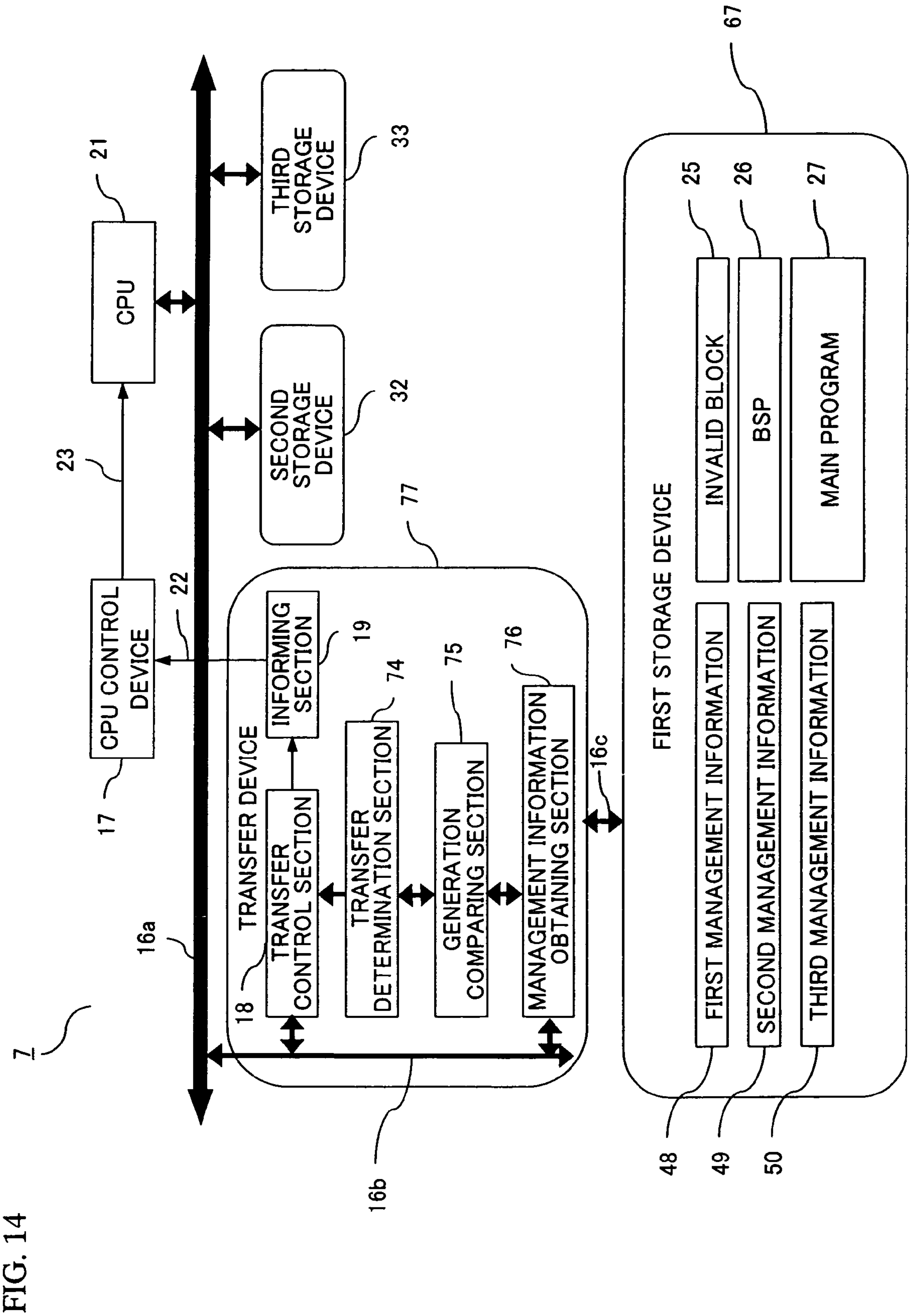
FIG. 14 is a block diagram illustrating a structure of an information processing device according to a seventh embodiment of the present invention.

FIG. 14 is a block diagram illustrating a structure of an information processing device according to a seventh embodiment of the present invention. The information processing device 7 of the seventh embodiment has a basic structure similar to that of the second embodiment (FIG. 7), and is different from that of the second embodiment in that the first storage device 67 includes the first to third management information 48 to 50 and a transfer device 77 further includes a generation comparing section 75.

The first to third management information 48 to 50 store the same value. Note that, in the seventh embodiment, the first storage device 67 stores the three pieces of management information, but the number of pieces of management information does not necessarily need to be three, and two or more pieces of management information may be stored. In addition, a storage position of each piece of management information may be fixed, or freely changed as in the second embodiment, in the transfer device 77.

Hereinafter, it is assumed that the first to third management information 48 to 50 have been written in the first storage device 67 in this order. In this case, the management information obtaining section 76 reads the management information in order of writing, i.e., reads the first management information 48, the second management information 49, and the third management information in this order. Hereinafter, it is also assumed that the first to third management information 48 to 50 are stored in three consecutive blocks.

When a transfer determination section 74 instructs the management information obtaining section 76 to obtain management information, the generation comparing section 75 instructs the management information obtaining section 76 to read the first to third management information 48 to 50 stored in the first storage device 67 in the same order as when writing was performed. The generation comparing section 75 compares the values of the pieces of management information successively read by the management information obtaining section 76, and among them, determines management information which is not invalid and is highly likely to be latest. Thereafter, the generation comparing section 75 returns the management information which is not invalid and is highly likely to be the latest, to the transfer determination section 74.

Specifically, when one of the plurality of pieces of management information which was read at a first time and one thereof which was read at a second time have the same value, the generation comparing section 75 transfers such a value as latest-generation management information to the transfer determination section 74.

On the other hand, when the first read management information and the second read management information have different values, the generation comparing section 75 compares the second read management information with management information which was read at a third time. When the second read management information and the third read management information have different values, the generation comparing section 75 transfers the first read management information as latest-generation management information to the transfer determination section 74. When the second read management information and the third read management information have the same value, the generation comparing section 75 transfers the second read management information as previous-generation management information to the transfer determination section 74.

FIG. 15 is a diagram illustrating examples of the first to third management information 48 to 50. As described above, writing of management information is performed in order of the first to third management information. More specifically, FIG. 15 illustrates possible cases A to G of generation information of management information, depending on timing of occurrence of a failure which is assumed to occur during updating of these management information. For example, the case B of FIG. 15 indicates that the first management information and the second management information are updated into latest-generation information, but the third management information is not updated and remains in a previous generation.

Figure 16:
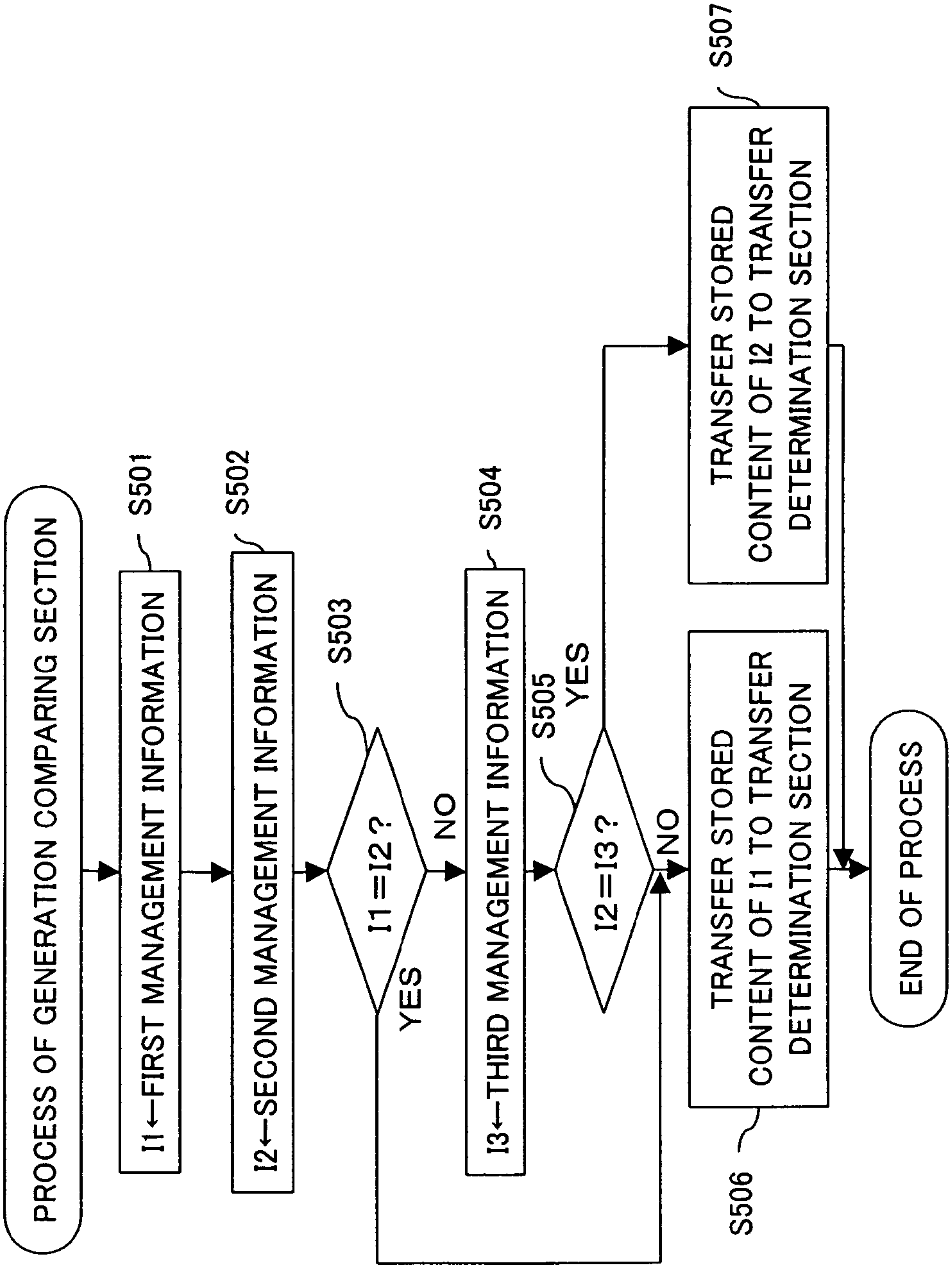
FIG. 16 is a flowchart illustrating an exemplary control process of a generation comparing section of FIG. 14.

FIG. 16 is a flowchart illustrating an exemplary control process of the generation comparing section 75. Referring to FIG. 16 in combination with FIG. 14, when the transfer determination section 74 references management information, the generation comparing section 75 reads the first management information 48 from the first storage device 67 into a buffer I1 (step S501), and reads the second management information 49 into a buffer I2 (step S502). These buffers I1 and I2 are composed of, for example, a non-volatile storage device included in the transfer device 77.

Next, the generation comparing section 75 compares a content stored in the buffer I1 with a content stored in the buffer I2 (step S503). When the stored content of the buffer I1 is equal to the stored content of the buffer I2 (YES in step S503), the generation comparing section 75 determines that the stored content of the buffer I1 is in a latest generation, transfers the content to the transfer determination section 74 (step S506), and ends the process. Such a process is performed, for example, when management information generations are distributed as illustrated in cases A, B, C, and G of FIG. 15. In this case, the cases A and G cannot be distinguished from each other. However, even in both the case A and the case G, invalid management information is not transferred to the transfer determination section 74.

On the other hand, when the stored content of the buffer I1 is not equal to the stored content of the buffer I2 (NO in step S503), the generation comparing section 75 reads the third management information 50 into a buffer I3 (step S504), and the buffer I2 is compared with the buffer I3 (step S505). When the stored content of the buffer I2 is equal to the stored content of the buffer I3 (YES in step S505), the generation comparing section 75 transfers the stored content of the buffer I2 as management information to the transfer determination section 74 (step S507), and ends the process. Such a process is performed, for example, when management information generations are distributed as illustrated in the cases D and F of FIG. 15. In this case, the cases D and F cannot be distinguished from each other. However, even in both the cases D and F, invalid management information is not transferred to the transfer determination section 74.

When the stored content of the buffer I2 is not equal to the stored content of the buffer I3 (NO in step S505), the generation comparing section 75 determines that the buffer I1 is latest-generation management information, and transfers the stored content of the buffer I1 to the transfer determination section 74 (step S506). Such a process is performed, for example, in the case E of FIG. 15.

By performing the above-described control process, the generation comparing section 75 compares management information values to eliminate invalid management information, and transfers management information which is highly likely to be in a latest generation, to the transfer determination section 74. When latest-generation management information is not obtained in the control process, the generation comparing section 75 transfers previous-generation management information to the transfer determination section 74.

As described above, the information processing device 7 of the seventh embodiment compares values of the first to third management information 48 to 50 stored in the first storage device 67, thereby making it possible to detect whether or not updating of management information is interrupted due to, for example, occurrence of a failure. In addition, the information processing device 7 can select management information which is highly likely to be valid and in a latest generation, thereby making it possible to improve the reliability of management information.

Eighth Embodiment

Figure 17:
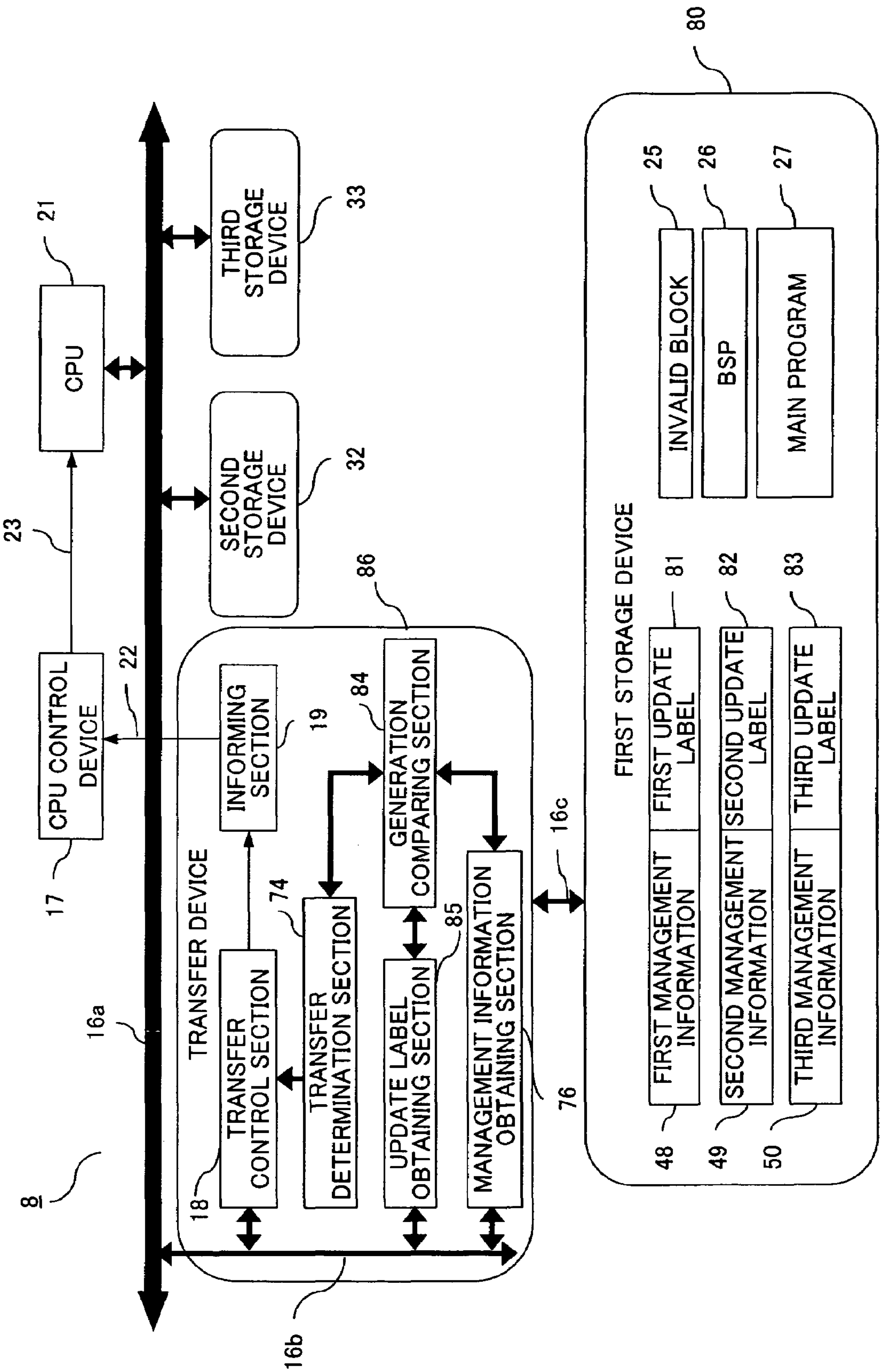
FIG. 17 is a block diagram illustrating a structure of an information processing device according to an eighth embodiment of the present invention.

FIG. 17 is a block diagram illustrating a structure of an information processing device according to an eighth embodiment of the present invention. The information processing device 8 of the eighth embodiment has a basic structure similar to that of the seventh embodiment (FIG. 14), and is different from that of the seventh embodiment in that each piece of management information includes first to third update labels 81 to 83, and a transfer device 86 includes an update label obtaining section 85.

The first update label 81 is composed of a bit sequence having a predetermined length. Every time the first management information 48 is updated, a bit value which is different from the previous bit value is stored. For example, assuming that the bit length of an update label is eight bits, and "AA" and "55" in hexadecimal are successively used as values to be recorded into the update label, the CPU 21 writes "AA" into the first update label 81 when the first management information 48 is updated at a first time, and "55" into the first update label 81 at the next update time. In this case, the update label obtaining section 85 can obtain an update status of the first management information 48 by referencing the first update label 81. Note that the bit length of an update label and values to be written into the update label may have other values. The second update label 82 and the third update label 83 are configured in a manner similar to that of the first update label 81.

The update label obtaining section 85 reads update labels corresponding to pieces of management information in the same order as when the pieces of management information were written. For example, in the eighth embodiment, when the first to third management information 48 to 50 were written in this order, the update label obtaining section 85 reads the first update label 81, the second update label 82, and the third update label 83 in this order.

When the transfer determination section 74 instructs the management information obtaining section 76 to obtain management information, a generation comparing section 84 of the eighth embodiment instructs the update label obtaining section 85 to obtain update labels corresponding to pieces of management information in order of writing of the pieces of management information which have been stored into a first storage device 80. The generation comparing section 84 compares values of the first to third update labels 81 to 83 successively read by the update label obtaining section 85, and selects management information which is not invalid and is highly likely to be latest. The generation comparing section 84 instructs the management information obtaining section 76 to obtain management information which is highly likely to be latest, and returns a value of the obtained management information to the transfer determination section 74.

Figure 18:
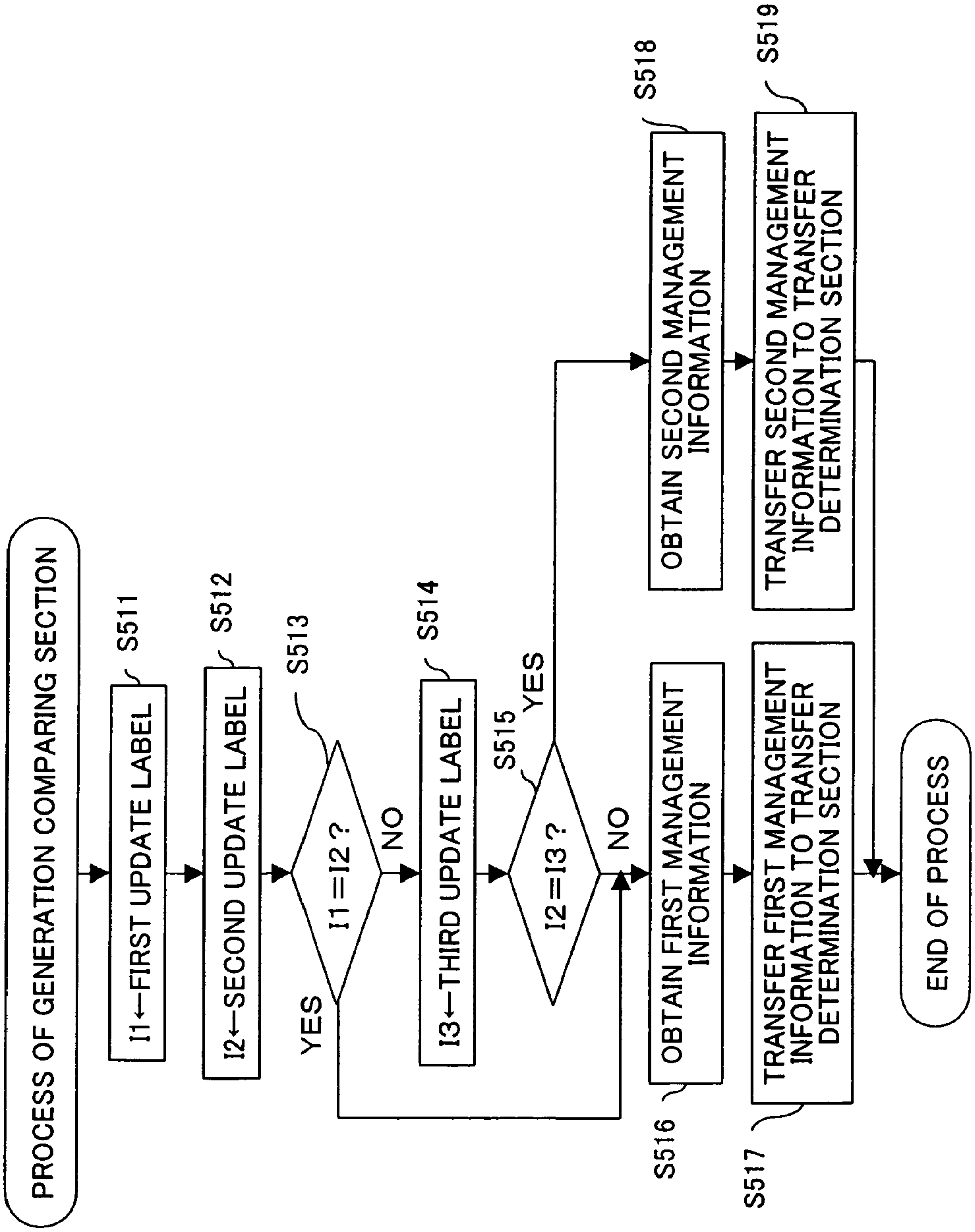
FIG. 18 is a flowchart illustrating an exemplary control process of a generation comparing section of FIG. 17.

FIG. 18 is a flowchart illustrating an exemplary control process of the generation comparing section 84. Referring to FIG. 18 in combination with FIG. 17, when the transfer determination section 74 references management information, the generation comparing section 84 reads the first update label 81 corresponding to the first management information 48 which was written at the first time, from the first storage device 80 to the buffer I1 (step S511), and reads the second update label 82 corresponding to the second management information 49 which was written at the second time, from the first storage device 80 to the buffer I2 (step S512).

Next, the generation comparing section 84 compares the stored content of the buffer I1 with the stored content of the buffer I2 (step S513). When the stored content of the buffer I1 is equal to the stored content of the buffer I2 (YES in step S513), the generation comparing section 84 instructs the management information obtaining section 76 to obtain the first management information 48 corresponding to the first update label 81 (step S516). Thereafter, the generation comparing section 84 determines that the first management information 48 is latest-generation management information, transfers the first management information 48 to the transfer determination section 74 (step S517), and ends the process.

On the other hand, when the stored content of the buffer I1 is not equal to the stored content of the buffer I2 (NO in step S513), the generation comparing section 84 reads the third update label 83 corresponding to the third management information 50 which was written at the third time, into the buffer I3 (step S514), and compares the stored content of the buffer I2 with the stored content of the buffer I3 (step S515). When the stored content of the buffer I2 is equal to the stored content of the buffer I3 (YES in step S515), the generation comparing section 84 determines that there is no management information which is not invalid and is in a latest generation, and instructs the management information obtaining section 76 to obtain the second management information 49 corresponding to the second update label 82 (step S518). Thereafter, the generation comparing section 84 transfers the second management information 49 to the transfer determination section 74 (step S519), and ends the process.

When the stored content of the buffer I2 is not equal to the stored content of the buffer I3 (NO in step S515), the generation comparing section 84 instructs the management information obtaining section 76 to obtain the first management information 48 corresponding to the first update label 81 (step S516). Thereafter, the generation comparing section 84 determines that the first management information 48 is latest-generation management information, transfers the first management information 48 to the transfer determination section 74 (step S517), and ends the process.

By performing the above-described control process, the generation comparing section 84 can use the first to third update labels 81 to 83 to eliminate invalid management information which occurs during the management information updating process, and transfer management information which is highly likely to be in a latest generation, to the transfer determination section 74. Also in this control process, when latest-generation management information is not obtained, the generation comparing section 84 transfers previous-generation management information to the transfer determination section 74.

As described above, the information processing device 8 of the eigtht embodiment obtains management information based on the first to third update labels 81 to 83, thereby making it possible to reduce the amount of data to be read and a buffer size. As a result, according to the information processing device 8, a high-speed operation and a low-cost system can be obtained.

For example, it is assumed that one-bit management information is used for each block of the first storage device 80 having 2048 blocks. In this case, if management information itself is used to determine the generation of the management information, a data amount of 2048 bits needs to be handled. However, if generation determination is performed using an 8-bit update label provided for each piece of management information, the amount of data required for the determination process is only 8 bits.

Ninth Embodiment

Figure 19:
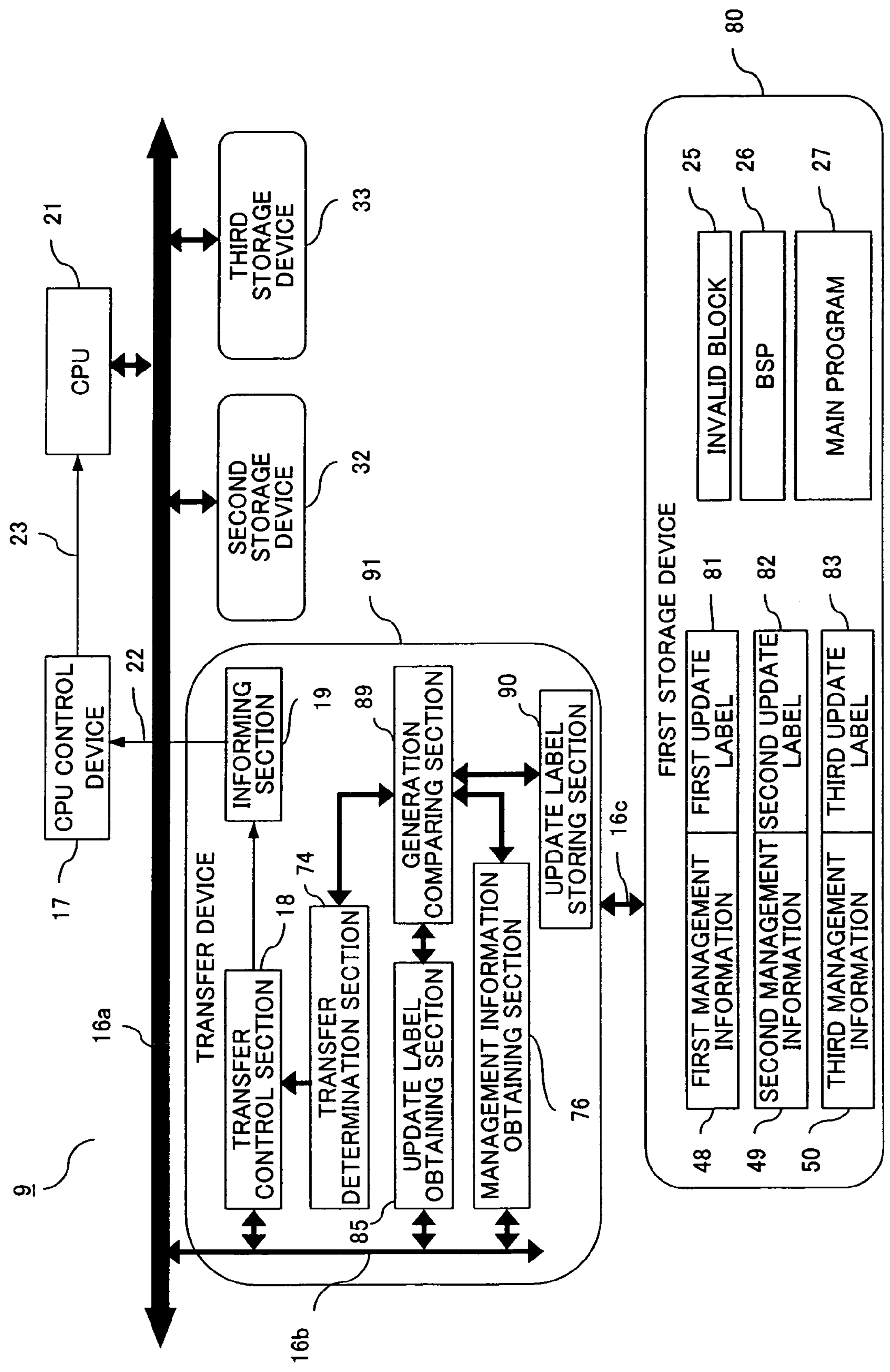
FIG. 19 is a block diagram illustrating a structure of an information processing device according to a ninth embodiment of the present invention.

FIG. 19 is a block diagram illustrating a structure of an information processing device according to a ninth embodiment of the present invention. The information processing device 9 of the ninth embodiment has a basic structure similar to that of the eighth embodiment (FIG. 17), and is different from that of the eighth embodiment in that a transfer device 91 further includes an update label storing section 90.

The update label storing section 90 is composed of, for example, a non-volatile storage device, and every time the first to third management information 48 to 50 are updated, stores an update label used for updating, as a label for comparison.

When the transfer determination section 74 instructs the management information obtaining section 76 to obtain management information, a generation comparing section 89 instructs the update label obtaining section 85 to read the first to third update labels 81 to 83 in order of writing of the first to third management information 48 to 50 stored in the first storage device 80. The generation comparing section 89 compares an update label read out by the update label obtaining section 85 with the comparison label stored in the update label storing section 90. When these labels have the same value, the generation comparing section 89 determines that management information corresponding to the update label is latest-generation management information. Thereafter, the generation comparing section 89 instructs the management information obtaining section 76 to obtain the determined latest-generation management information, and returns a value of the obtained management information to the transfer determination section 74.

Figure 20:
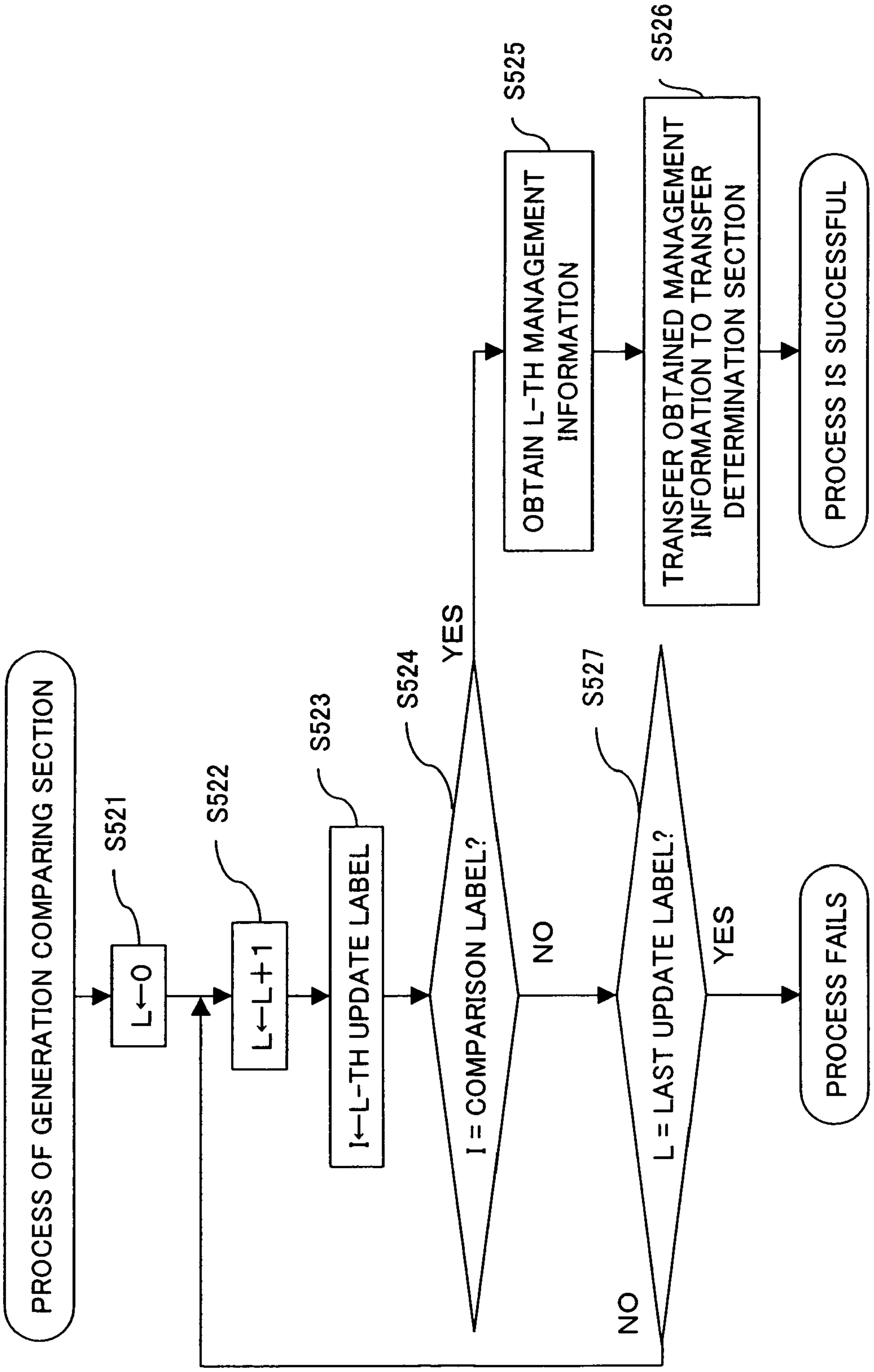
FIG. 20 is a flowchart illustrating an exemplary control process of a generation comparing section of FIG. 19.

FIG. 20 is a flowchart illustrating an exemplary control process of the generation comparing section 89. Referring to FIG. 20 in combination with FIG. 19, when management information is referenced from the transfer determination section 74, the generation comparing section 89 initializes a number L of a label to be read with “0” (step S521).

Next, the generation comparing section 89 adds “1” to the label number L (step S522), and thereafter, reads an L-th update label into a buffer I (step S523), and compares a value of the buffer I with a value of the comparison label stored in the update label storing section 90 (step S524). When the value of the buffer I is equal to the value of the comparison label (YES in step S524), the generation comparing section 89 instructs the management information obtaining section 76 to obtain L-th management information (step S525). Thereafter, the generation comparing section 89 transfers the obtained management information as latest-generation management information to the transfer determination section 74 (step S526), and ends the process.

On the other hand, when the value of the buffer I is not equal to the value of the comparison label (NO in step S524), the generation comparing section 89 determines whether or not the label number L is a number indicating a last update label (step S527). When the label number L is a number indicating the last update label (YES in step S527), the generation comparing section 89 cannot obtain a valid update label, so that the process fails. When the label number L is not the number indicating the last update label, the generation comparing section 89 returns to step S522, and repeats a similar process.

By performing the above-described control process, the generation comparing section 89 can detect latest-generation management information based on the comparison label stored in the update label storing section 90 with certainty and efficiency.

As described above, in the information processing device 9 of the ninth embodiment, by using the comparison label stored in the update label storing section 90 of the transfer device 91, a latest-generation update label can be detected with certainty. In addition, since latest-generation management information can be used with certainty, the reliability of management information can be improved.

Although the update label storing section 90 stores the same content as the content of an update label in the ninth embodiment, the update label storing section 90 may store the number of an update label used as the comparison label. In this case, the update label obtaining section 85 may use an update label corresponding to the number of the update label.

Tenth Embodiment

Figure 21:
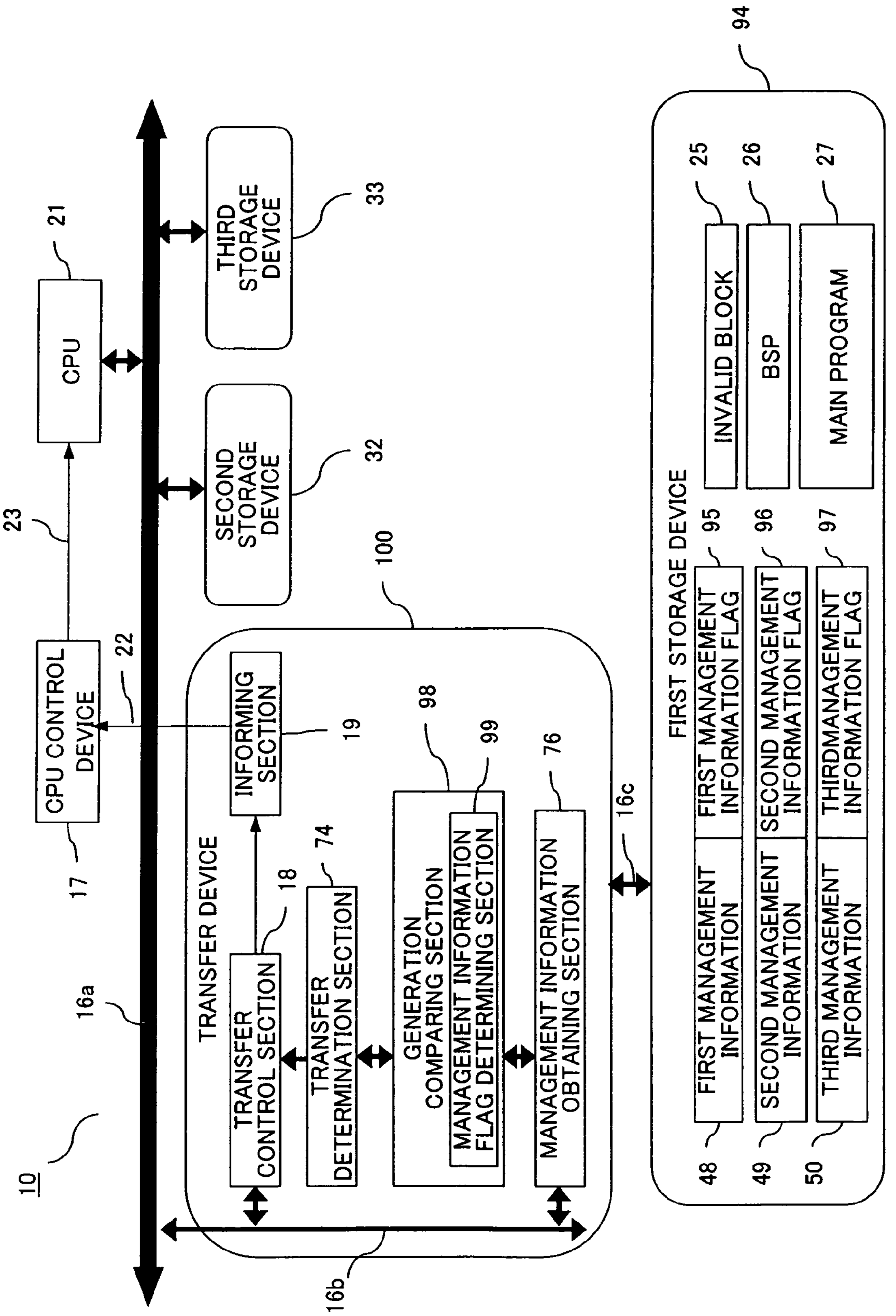
FIG. 21 is a block diagram illustrating an information processing device according to a tenth embodiment of the present invention.

FIG. 21 is a block diagram illustrating an information processing device according to a tenth embodiment of the present invention. The information processing device 10 of the tenth embodiment has a basic structure similar to that of the seventh embodiment (FIG. 14), and is different from that of the seventh embodiment in that a first storage device 94 further includes first to third management information flags 95 to 97, and a generation comparing section 98 of a transfer device 100 includes a management information flag determining section 99.

The first management information flag 95 is composed of a plurality of bits. The first management information flag 95 stores a first value when the first management information 48 is management information, and a second value when the first management information 48 is other data. Thereby, even if data other than management information is written in an area of the first management information 48, it is possible to identify the first management information 48 as management information. The first value is set into the first management information flag 95 every time the first management information 48 is rewritten. Note that each of the second management information flag 96 and the third management information flag 97 is similar to the first management information flag 95.

The management information flag determining section 99 distinguishes management information corresponding to each management information flag from other data, based on the first to third management information flags 95 to 97.

When management information which was read at a first time is the same as management information which was read at a second time, the generation comparing section 98 of the tenth embodiment determines that the value is latest-generation management information, and transfers the value to the transfer determination section 74.

On the other hand, when the management information which was read at the first time is different from the management information which was read at the second time, the generation comparing section 98 references a management information flag of the management information which was read at the first time by the management information flag determining section 99. As a result, when the management information flag of the first read management information has the first value indicating management information, the generation comparing section 98 transfers a value of the first read management information to the transfer determination section 74. When the management information flag of the first read management information has the second value indicating other data, the generation comparing section 98 transfers a value of the second read management information to the transfer determination section 74.

Figure 22:
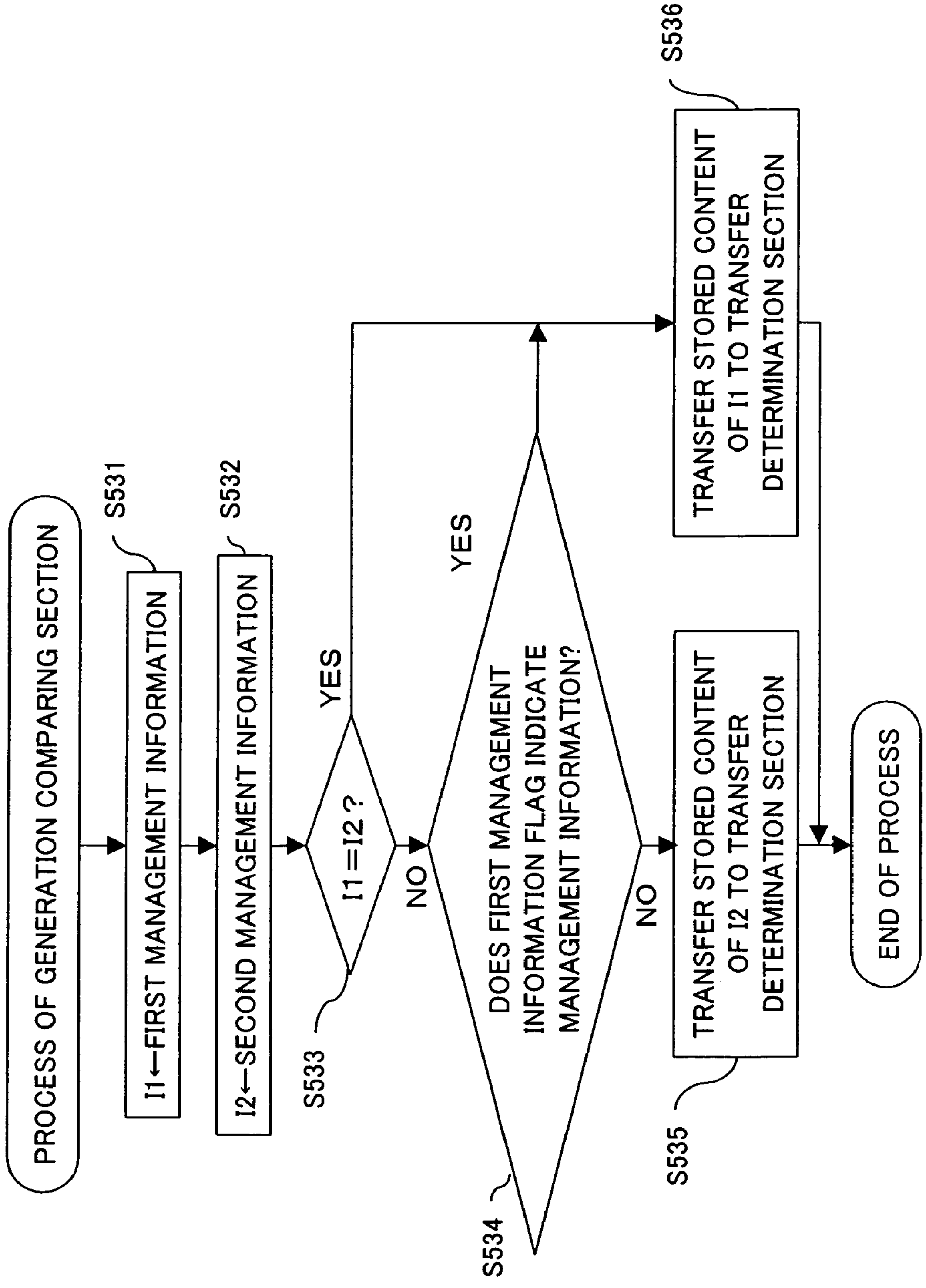
FIG. 22 is a flowchart illustrating an exemplary control process of a generation comparing section of FIG. 21.

FIG. 22 is a flowchart illustrating an exemplary control process of the generation comparing section 98. Referring to FIG. 22 in combination with FIG. 21, when management information is referenced from the transfer determination section 74, the generation comparing section 98 reads the first management information 48 which was written at a first time, among a plurality of pieces of management information stored in the first storage device 94, and the first management information flag 95 into the buffer I1 (step S531), and reads the second management information 49 which was written at a second time and the second management information flag 96 into the buffer I2 (step S532).

Next, the generation comparing section 98 compares the stored content of the buffer I1 with the stored content of the buffer I2 (step S533). When the stored content of the buffer I1 is equal to the stored content of the buffer I2 (YES in step S533), the generation comparing section 98 determines that the stored content of the buffer I1 is latest-generation management information, transfers the value to the transfer determination section 74 (step S536), and ends the process.

On the other hand, when the stored content of the buffer I1 is not equal to the stored content of the buffer I2 (NO in step S533), the generation comparing section 98 checks the value of the first management information flag 95 obtained in the buffer I1 using the management information flag determining section 99 (step S534). As a result, when the first management information flag 95 is the first value indicating management information (YES instep S534), the generation comparing section 98 determines that the buffer I1 is latest-generation management information, transfers the first management information 48 obtained in the buffer I1 to the transfer determination section 74 (step S536), and ends the process. When the first management information flag 95 is not the first value indicating management information (NO in step S534), the generation comparing section 98 determines that the buffer I2 is previous-generation management information, transfers the second management information 49 obtained in the buffer I2 to the transfer determination section 74 (step S535), and ends the process.

By performing the above-described control process, the generation comparing section 98 can compare each piece of management information with the value of a management information flag, eliminate invalid management information, and transfer management information which is highly likely to be in a latest generation, to the determination section. Also in such a control, when latest-generation management information is not obtained, previous-generation management information is transferred to the transfer determination section 74.

As described above, in the information processing device 10 of the tenth embodiment, management information can be distinguished from other data with certainty, so that the accuracy of detection of latest-generation management information is improved, thereby making it possible to improve the reliability of management information.

Preferably, the first to third management information flags 95 to 97 have a value of 8 bits or more. When the management information flag has a bit length which is large to some degree, it is possible to avoid a situation that the management information flag has a value indicating management information by accident even if a failure occurs during an erase process or a write process of the first storage device 94. For a similar reason, as the value of the management information flag, a value other than a bit pattern which is used for an erase process of the first storage device 94 is preferably used.

Eleventh Embodiment

Figure 23:
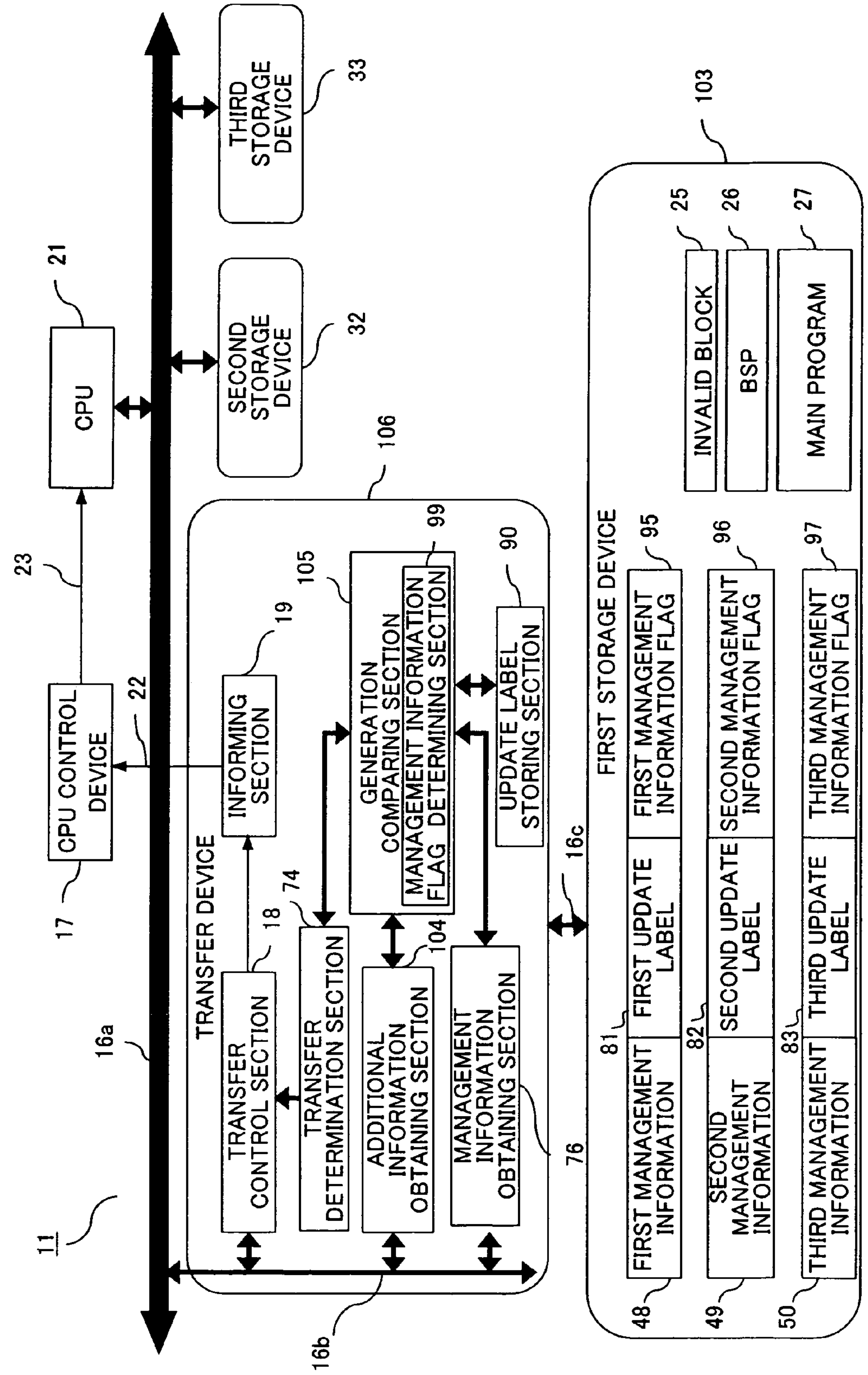
FIG. 23 is a block diagram illustrating a structure of an information processing device according to an eleventh embodiment of the present invention.

FIG. 23 is a block diagram illustrating a structure of an information processing device according to an eleventh embodiment of the present invention. The information processing device 11 of the eleventh embodiment has a basic structure similar to that of the eighth embodiment (FIG. 17), and is different from that of the eighth embodiment in that a first storage device 103 further stores first to third management information flags 95 to 97, a generation comparing section 105 includes a management information flag determining section 99, a transfer device 106 includes an update label storing section 90, and an additional information obtaining section 104 is included instead of the update label obtaining section of FIG. 17.

Note that the first to third management information flags 95 to 97, and the management information flag determining section 99 in the generation comparing section 105 are similar to those of the tenth embodiment (FIG. 21). The update label storing section 90 of the transfer device 106 is similar to that of the ninth embodiment (FIG. 19).

The additional information obtaining section 104 has a function of obtaining both an update label and a management information flag which correspond to management information from the first storage device 103 when determining the generation of the management information.

Hereinafter, it is assumed that first to third management information 48 to 50 are stored in three consecutive blocks. First to third update labels 81 to 83 are stored in the same blocks as those of the first to third management information 48 to 50, respectively.

Figure 24:
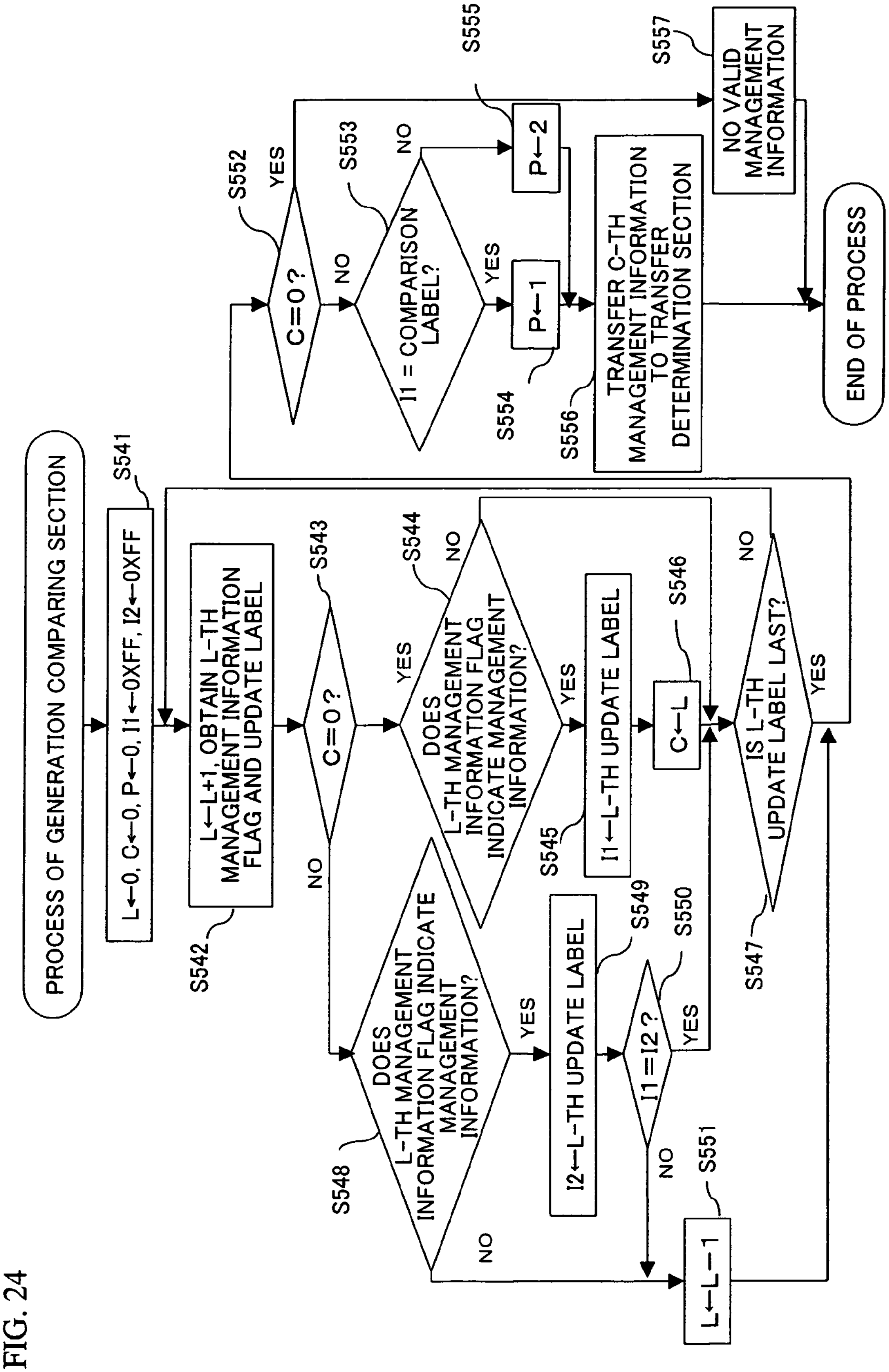
FIG. 24 is a flowchart illustrating a control process of a generation comparing section of FIG. 23.

FIG. 24 is a flowchart illustrating a control process of the generation comparing section 105. Referring to FIG. 24 in combination with FIG. 23, when the transfer determination section 74 references management information, the generation comparing section 105 initializes a label number L, a number C of management information, and a generation P of the management information, with "0", and the buffer I1 and the buffer I2 with "FF" in hexadecimal (step S541).

The generation comparing section 105 adds "1" to the label number L, and thereafter, obtains an L-th management information flag and an update label via the additional information obtaining section 104 (step S542), and further, determines a value of the number C of the management information (step S543).

When the number C of the management information is 0 (YES in step S543), a first piece of management information has not yet been detected. The generation comparing section 105 determines whether or not the L-th management information flag has a value indicating management information using the management information flag determining section 99 (step S544). As a result, when the L-th management information flag has the first value indicating management information (YES in step S544), the generation comparing section 105 reads a value of the L-th update label into the buffer I1 (step S545), and sets the label number L into the number C of management information (step S546), and thereafter, performs a process of step S547 described below.

In step S544, when the L-th management information flag does not have the first value indicating management information (NO in step S544), the generation comparing section 105 does not perform the processes of steps S545 and S546, and performs the process of step S547 described below.

On the other hand, when the number C of the management information is not 0 (NO in step S543), the buffer I1 already holds a value of an update label. The generation comparing section 105 determines whether or not the L-th management information flag has a value indicating management information using the management information flag determining section 99 (step S548) As a result, when the L-th management information flag has the first value indicating management information (YES in step S548), the generation comparing section 105 reads the value of the L-th update label into the buffer I2 (step S549), and compares the stored content of the buffer I1 with the value of the buffer I2 (step S550). When the stored content of the buffer I1 is equal to the stored content of the buffer I2 (YES in step S550), the generation comparing section 105 performs the process of step S547 described below.

In step S547, the generation comparing section 105 determines whether or not the label number L is the number of the last update label. When the label number L is not the last update label (NO in step S547), the generation comparing section 105 returns to step S542 and repeats the above-described process. When the label number L is the last update label (YES in step S547), the generation comparing section 105 performs a process of step S552 described below.

In the case of NO in step S548 (when the L-th management information flag does not indicate the first value indicating management information), and in the case of NO in step S550 (when the stored content of the buffer I1 is not equal to the stored content of the buffer I2), the generation comparing section 105 subtracts "1" from the label number L (step S551), and thereafter, performs the process of step S552 described below.

In step S552, the generation comparing section 105 determines a value of a number C of management information. When C is 0 (YES in step S552), the generation comparing section 105 determines that valid management information has not been detected (step S557), and ends the process.

When C is not 0 (NO in step S552), the generation comparing section 105 compares the stored content of the buffer I1 with a comparison label stored in the update label storing section 90 (step S553). When the buffer I1 is equal to the comparison label (YES in step S553), the generation comparing section 105 sets "1" indicating a latest generation into the generation P of the management information (step S554). When the buffer I1 is not equal to the comparison label (NO in step S553), the generation comparing section 105 sets "2" indicating a previous generation into the generation P of the management information used (step S555). Thereafter, the generation comparing section 105 obtains C-th management information via the management information obtaining section 76, and transfers the obtained management information to the transfer determination section 74 (step S556).

By the above-described control of the generation comparing section 105, the generations of the first to third management information 48 to 50 can be determined with certainty using the first to third update labels 81 to 83, the comparison label stored in the update label storing section 90, and the first to third management information flags 95 to 97. More specifically, when P is 1, it is determined that the C-th to L-th management information are in a latest generation. When P is 2, it is determined that the C-th to L-th management information are in a previous generation. When P is 0, it is determined that management information has not been obtained.

As described above, according to the information processing device 11 of the eleventh embodiment, the generation of management information can be determined with higher certainty, thereby making it possible to further improve the reliability of management information.

Note that, in the information processing device 11 of the eleventh embodiment, even when only previous-generation management information has been obtained, the generation comparing section 105 transfers the previous-generation management information to the transfer determination section 74. Instead of such a structure, when previous-generation management information has not been obtained, the generation comparing section 105 may determine that it is a system error instead of transferring the management information to the transfer determination section 74.

Twelfth Embodiment

Figure 25:
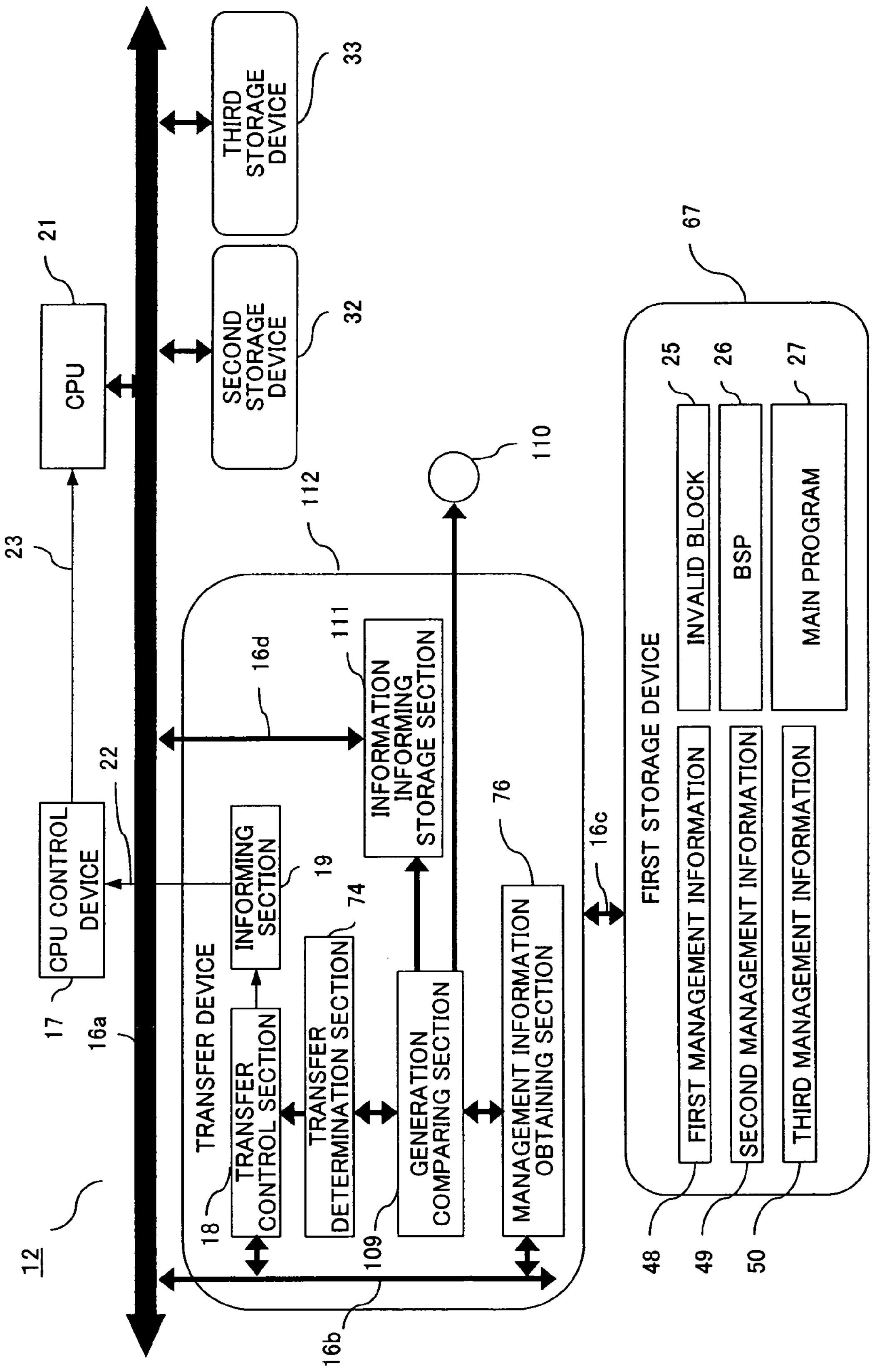
FIG. 25 is a block diagram illustrating a structure of an information processing device according to a twelfth embodiment of the present invention.
Figure 26A:
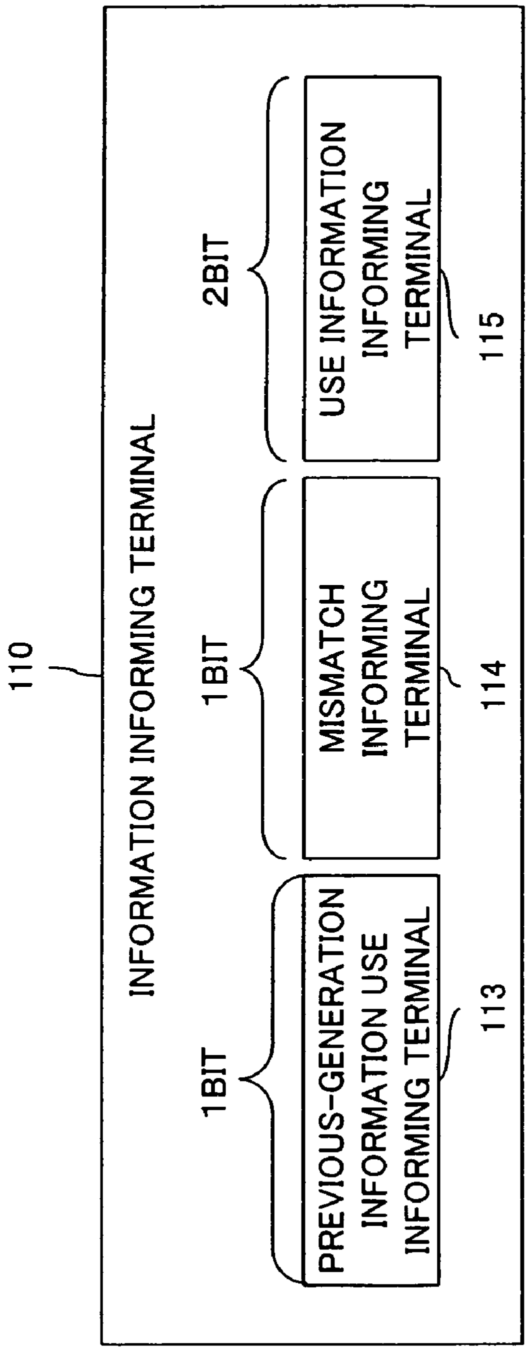
FIG. 26A is a diagram illustrating an exemplary structure of an information informing terminal of FIG. 25.
Figure 26B:
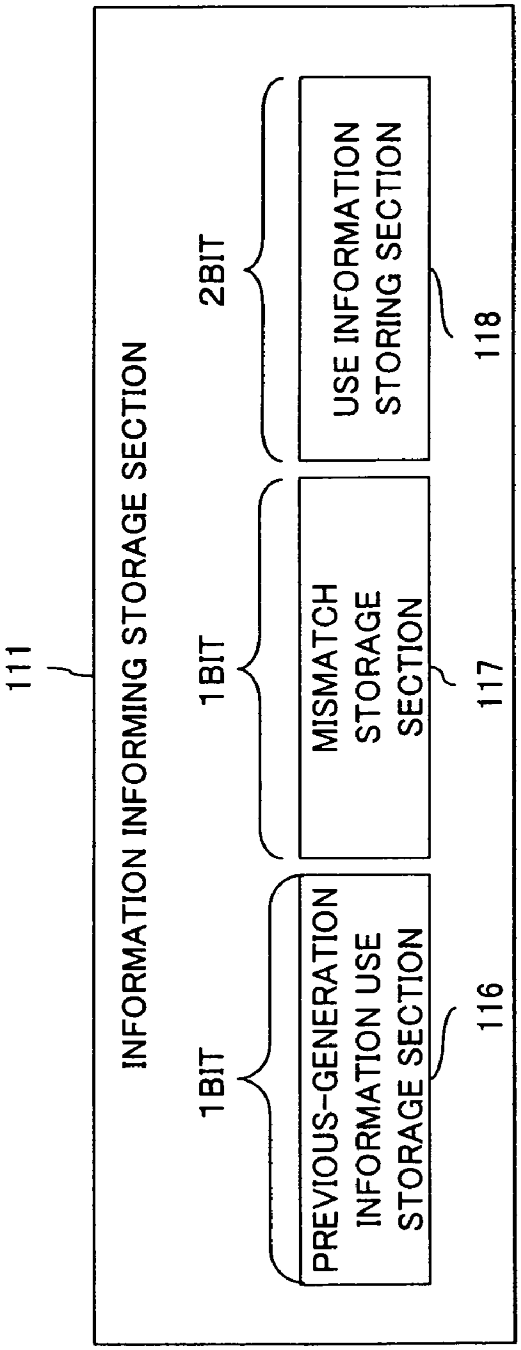
FIG. 26B is a diagram illustrating an exemplary structure of an information informing storage section of FIG. 25.

FIG. 25 is a block diagram illustrating a structure of an information processing device according to a twelfth embodiment of the present invention. FIGS. 26A and 26B are diagrams illustrating exemplary structures of an information informing terminal and an information informing storage section of FIG. 25, respectively. The information processing device 12 of the twelfth embodiment has the basic structure similar to that of the seventh embodiment (FIG. 14), and is different from that of the seventh embodiment in that the information processing device 12 further includes an information informing terminal 110, and a transfer device 112 further includes an information informing storage section 111.

The information informing terminal 110 is a terminal for providing various pieces of information output from a generation comparing section 109 to the outside. In the twelfth embodiment, as illustrated in FIG. 26A, the information informing terminal 110 comprises a previous-generation information use informing terminal 113, a mismatch informing terminal 114, and a use information informing terminal 115. In the twelfth embodiment, the previous-generation information use informing terminal 113 and the mismatch informing terminal 114 are each a terminal capable of outputting one-bit information, and the use information informing terminal 115 is a terminal capable of outputting 2-bit information. Therefore, the information informing terminal 110 can output 4-bit information. Note that each terminal does not necessarily need to be configured to have such a number of bits, and the number of bits may be increased or decreased as required.

The previous-generation information use informing terminal 113 is a terminal which is used when the generation comparing section 109 determines that only previous-generation management information is obtained. For example, when the generation comparing section 109 determines the generation of each of the first to third management information 48 to 50 stored in the first storage device 67, and as a result, latest-generation management information is obtained, the generation comparing section 109 outputs a Lo-level signal from the previous-generation information use informing terminal 113. When the generation comparing section 109 obtains only previous-generation management information, the generation comparing section 109 outputs a Hi-level signal from the previous-generation information use informing terminal 113.

The mismatch informing terminal 114 is a terminal which is used when the generation comparing section 109 determines that not all pieces of management information are the same. For example, when the generation comparing section 109 determines the generation of each of the first to third management information 48 to 50 stored in the first storage device 67, and as a result, when it is determined that all pieces of management information are the same, the generation comparing section 109 outputs a Lo-level signal from the mismatch informing terminal 114. When the generation comparing section 109 determines that not all pieces of management information are the same, the generation comparing section 109 outputs a Hi-level signal from the mismatch informing terminal 114.

The use information informing terminal 115 is a terminal for outputting information for specifying management information which has been transferred from the generation comparing section 109 to the transfer determination section 74. For example, when the generation comparing section 109 determines the generation of each of the first to third management information 48 to 50 stored in the first storage device 67, and transfers the second management information 49 to the transfer determination section 74, the generation comparing section 109 outputs “2” using a 2-bit terminal. Similarly, when the generation comparing section 109 transfers the third management information 50 to the transfer determination section 74, the generation comparing section 109 outputs “3”.

As described above, the generation comparing section 109 can output the result of comparison of the first to third management information 48 to 50 from the information informing terminal 110 to the outside. With such a configuration, the generation comparing section 109 can inform the outside of a state of the CPU 21 before an operation of the CPU 21. Therefore, when a system boot cannot be performed, its cause can be investigated using information output from the information informing terminal 110.

The information informing storage section 111 is composed of, for example, a volatile storage device, and stores information output from the generation comparing section 109. The information informing storage section 111 is configured to be capable of being referenced by the CPU 21 via the data buses 16*a* and 16*d*. In the twelfth embodiment, as illustrated in FIG. 26B, the information informing storage section 111 comprises a previous-generation information use storage section 116, a mismatch storage section 117, and a use information storing section 118. The information informing storage section 111 of the twelfth embodiment is composed of a 4-bit register. The previous-generation information use storage section 116 and the mismatch storage section 117 can each store 1-bit information, and the use information storing section 118 can store 2-bit information. Note that these numbers of bits may be increased or decreased as required.

The previous-generation information use storage section 116 is used when the generation comparing section 109 determines that only previous-generation management information is obtained. For example, when the generation comparing section 109 determines the generation of each of the first to third management information 48 to 50 stored in the first storage device 67, and the generation comparing section 109 obtains latest-generation management information, the previous-generation information use storage section 116 stores “0”. When the generation comparing section 109 obtains only previous-generation management information, the previous-generation information use storage section 116 stores The mismatch storage section 117 is used when the generation comparing section 109 determines that not all pieces of management information are the same. For example, when the generation comparing section 109 determines the generation of each of the first to third management information 48 to 50 stored in the first storage device 67, and determines that all of the pieces of management information are the same, the mismatch storage section 117 stores “0”. When the generation comparing section 109 determines that not all of the pieces of management information are the same, the mismatch storage section 117 stores “1”.

The use information storing section 118 stores information for specifying management information which has been transferred from the generation comparing section 109 to the transfer determination section 74. For example, when the generation comparing section 109 determines the generation of each of the first to third management information 48 to 50 stored in the first storage device 67, and the generation comparing section 109 transfers the second management information 49 to the transfer determination section 74, the use information storing section 118 stores “2” using a 2-bit register. Similarly, when the generation comparing section 109 transfers the third management information 50 to the transfer determination section 74, the use information storing section 118 stores “3”.

As described above, the information informing storage section 111 can store information obtained from the generation comparing section 109. With such a configuration, it is possible to detect a state before being started up by the CPU 21, after a system boot, and therefore, information stored in the information informing storage section 111 can be used to take necessary measures after the system boot.

Thirteenth Embodiment

Figure 27:
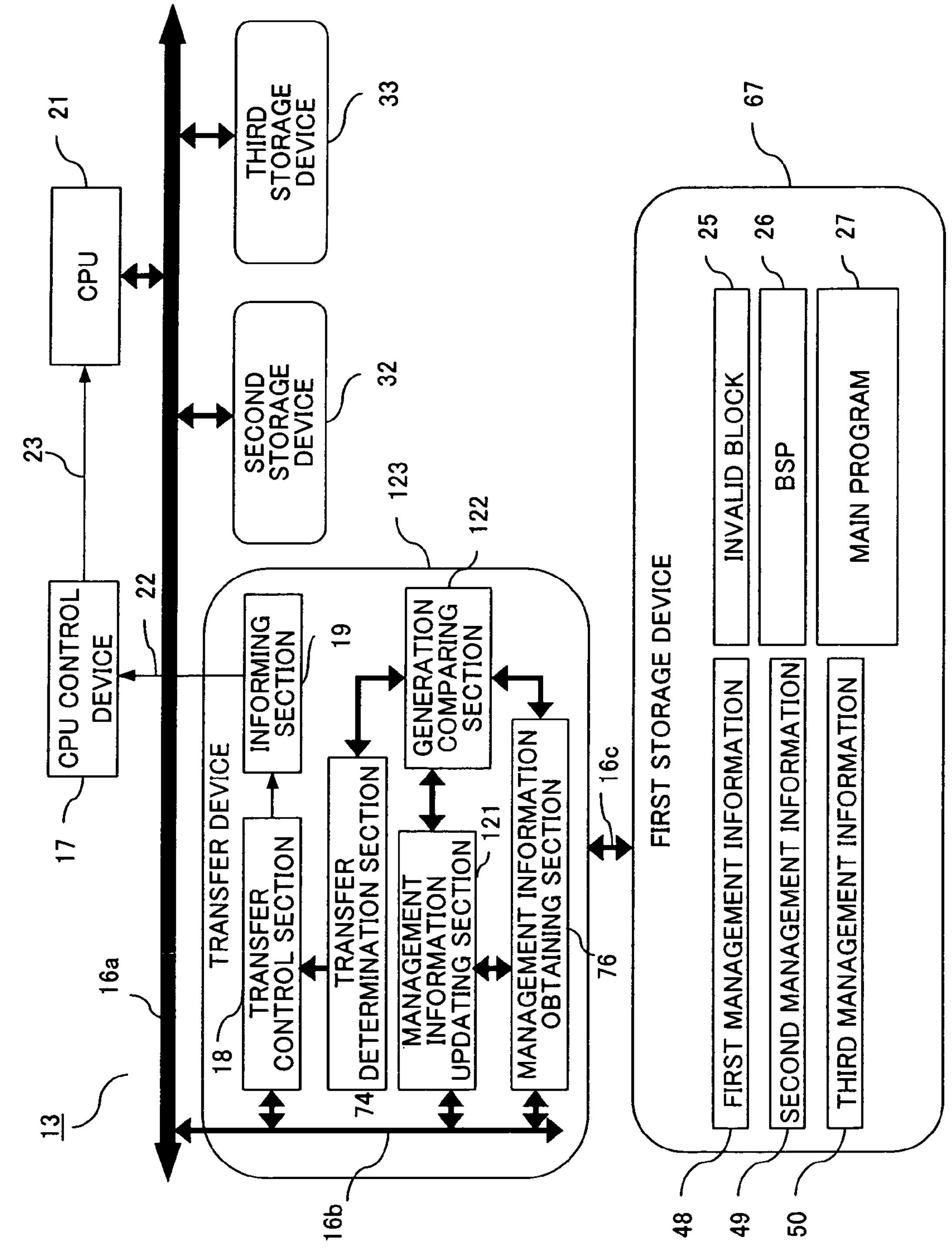
FIG. 27 is a block diagram illustrating a structure of an information processing device according to a thirteenth embodiment of the present invention.

FIG. 27 is a block diagram illustrating a structure of an information processing device according to a thirteenth embodiment of the present invention. The information processing device 13 of the thirteenth embodiment has a basic structure similar to that of the seventh embodiment (FIG. 14), and is different from that of the seventh embodiment in that a transfer device 123 further includes a management information updating section 121.

When informed of positions of management information to be updated and latest-generation management information by a generation comparing section 122, the management information updating section 121 obtains latest-generation management information via the management information obtaining section 76, and thereafter, rewrites the management information to be updated.

The generation comparing section 122 of the thirteenth embodiment has a basic function similar to that of the seventh embodiment, and can detect management information which is not in a latest generation and informs the management information updating section 121 of the positions of management information to be updated and latest-generation management information.

Figure 28:
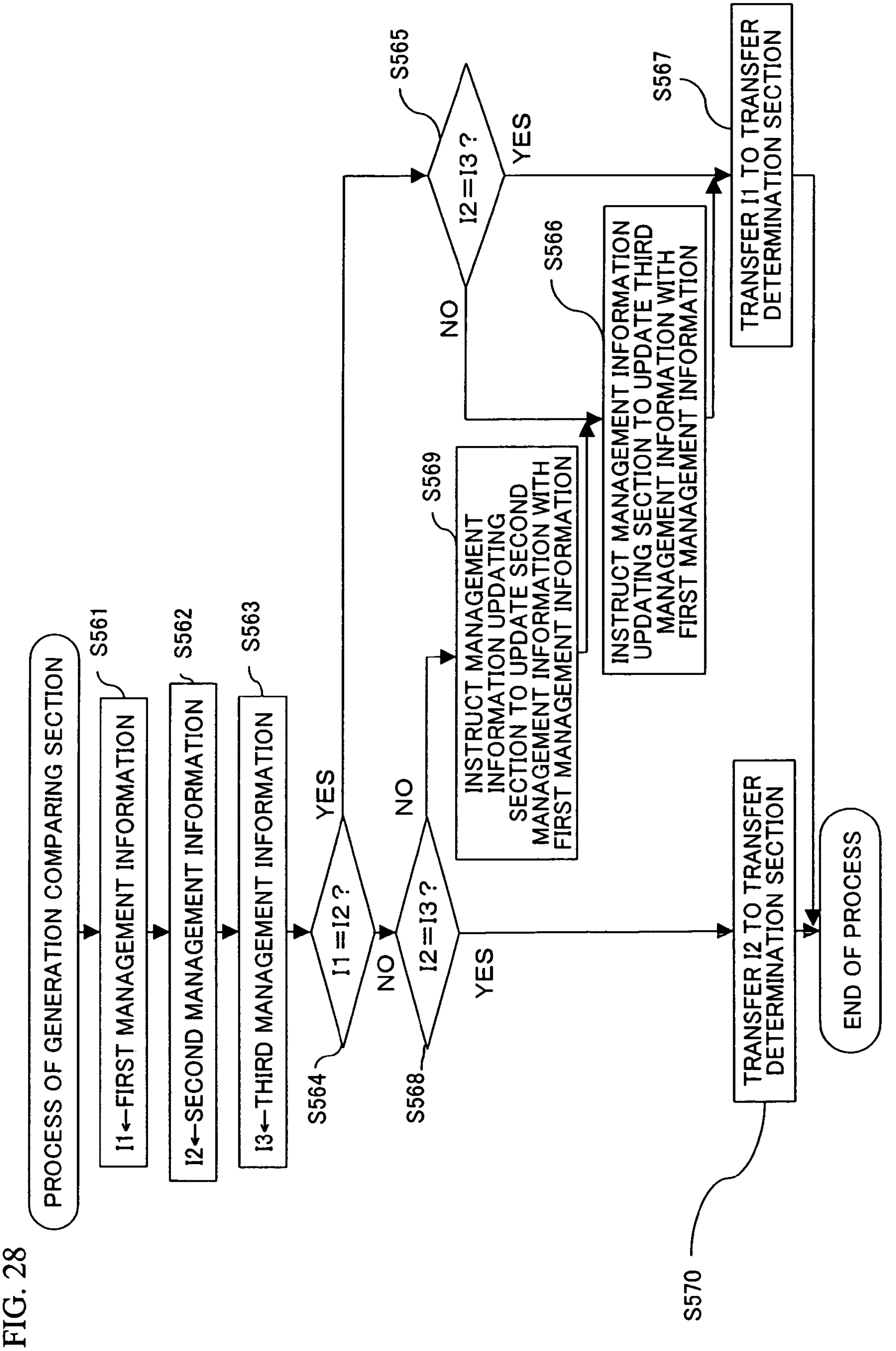
FIG. 28 is a flowchart illustrating an exemplary control process of a generation comparing section of FIG. 27.

FIG. 28 is a flowchart illustrating an exemplary control process of the generation comparing section 122. Referring to FIG. 28 in combination with FIG. 27, when the transfer determination section 74 references management information, the generation comparing section 122 reads the first management information 48 which was written at a first time, from the first storage device 67 to the buffer I1 (step S561), and the second management information 49 which was written at a second time, into the buffer I2 (step S562). The generation comparing section 122 also reads the third management information 50 which was written at the third time, into the buffer I3 (step S563).

Next, the generation comparing section 122 compares the stored content of the buffer I1 with the stored content of the buffer I2 (step S564). When the stored content of the buffer I1 is equal to the stored content of the buffer I2 (YES in step S564), the generation comparing section 122 compares the stored content of the buffer I2 with the stored content of the buffer I3 (step S565). When the stored content of the buffer I2 is equal to the stored content of the buffer I3 (YES in step S565), the generation comparing section 122 determines that all pieces of management information are in the same generation, and transfers the stored content of the buffer I1 to the transfer determination section 74 (step S567).

When the stored content of the buffer I2 is not equal to the stored content of the buffer I3 (NO in step S565), the generation comparing section 122 determines that the third management information 50 is not latest-generation management information, and instructs the management information updating section 121 to update the third management information 50 with the first management information 48 (step S566). Thereafter, the generation comparing section 122 transfers the stored content of the buffer I1 to the transfer determination section 74 (step S567), and ends the process.

On the other hand, in step S564, when the stored content of the buffer I1 is not equal to the stored content of the buffer I2 (NO in step S564), the generation comparing section 122 compares the stored content of the buffer I2 with the stored content of the buffer I3 (step S568). When the stored content of the buffer I2 is equal to the buffer I3 (YES in step S568), the generation comparing section 122 determines that the stored content of the buffer I2 is previous-generation management information, and transfers the stored content of the buffer I2 to the transfer determination section 74 (step S570), and ends the process. In this case, since latest-generation management information is not present, the generation comparing section 122 does not instruct the management information updating section 121 to update management information.

When the stored content of the buffer I2 is not equal to the stored content of the buffer I3 (NO in step S568), the generation comparing section 122 determines that only the first management information 48 is in a latest generation, and the first management information 48 instructs the management information updating section 121 to update the second management information 49 (step S569). Further, the generation comparing section 122 instructs the management information updating section 121 to update the third management information 50 with the first management information 48 (step S566). Thereafter, the generation comparing section 122 transfers the stored content of the buffer I1 to the transfer determination section 74, and ends the process.

By the above-described control, the generation comparing section 122 compares the first to third management information 48 to 50, and if there is any management information which is not in a latest generation, instructs the management information updating section 121 to update the management information with latest-generation management information. In addition, in the thirteenth embodiment, the generation comparing section 122 does not perform automatic updating of management information when it is determined that latest-generation management information is not present.

As described above, in the information processing device 13 of the thirteenth embodiment, management information which is not in a latest generation can be automatically updated using latest-generation management information, thereby making it possible to further increase the reliability of management information.

Fourteenth Embodiment

Figure 29:
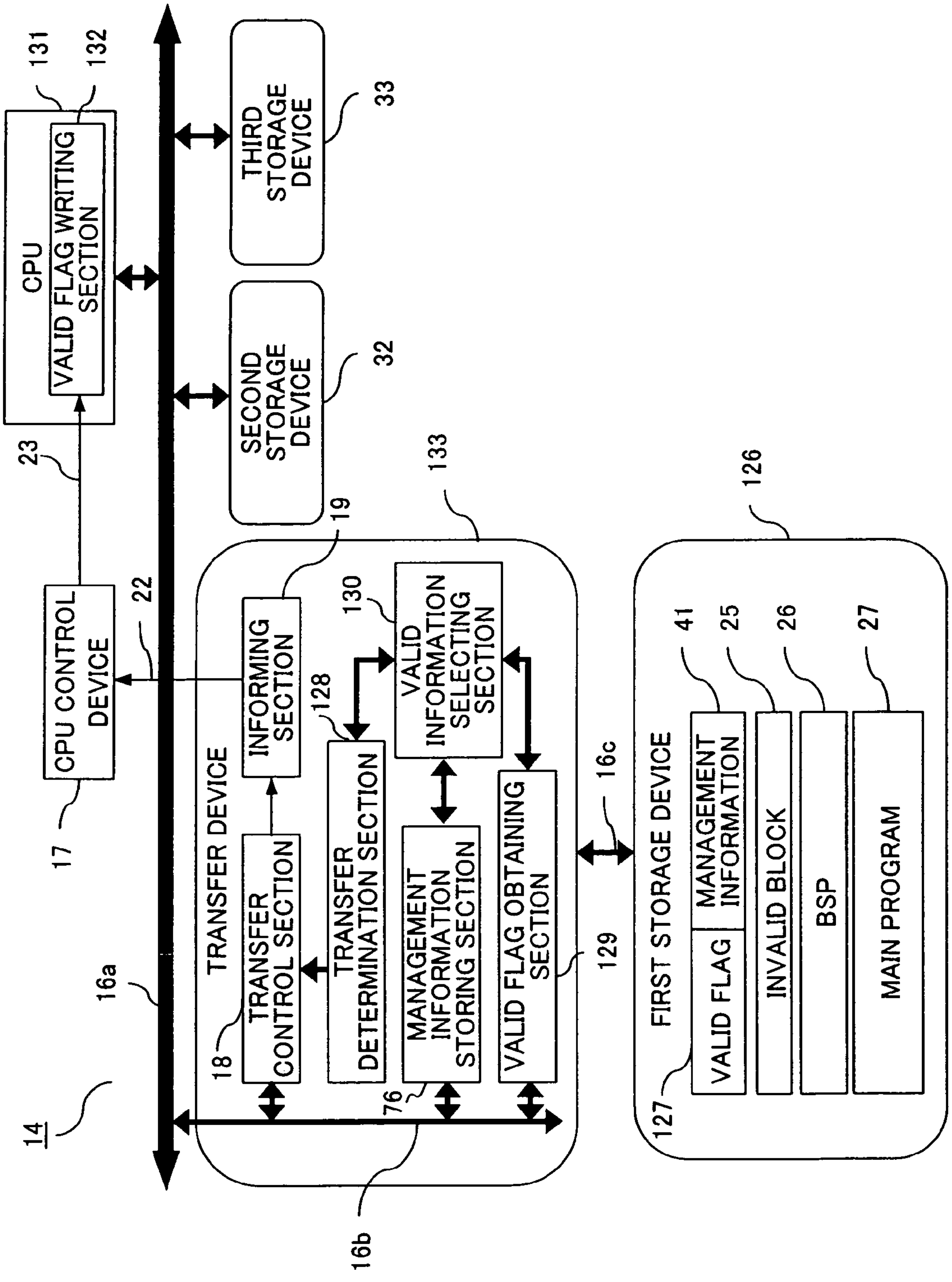
FIG. 29 is a block diagram illustrating a structure of an information processing device according to a fourteenth embodiment of the present invention.

FIG. 29 is a block diagram illustrating a structure of an information processing device according to a fourteenth embodiment of the present invention. The information processing device 14 of the fourteenth embodiment has a basic structure similar to that of the second embodiment (FIG. 7), and is different from that of the second embodiment in that a first storage device 126 further stores a valid flag 127, a transfer device 133 further includes a valid flag obtaining section 129 and a valid information selecting section 130, and a CPU 131 comprises a valid flag writing section 132.

The valid flag 127 is written in the same block as that in which the management information 41 is written, and indicates whether the management information 41 is valid or invalid. The valid flag 127 is initialized with a value indicating invalidity in association with writing of the management information 41.

When the transfer determination section 128 requests the management information obtaining section 76 to obtain the management information 41, the valid information selecting section 130 instructs the valid flag obtaining section 129 to obtain the valid flag 127. When the valid flag 127 obtained by the valid flag obtaining section 129 has a value indicating validity, the valid information selecting section 130 instructs the management information obtaining section 76 to obtain the management information 41, and transfers the obtained management information 41 to the transfer determination section 128. When the valid flag 127 has a value indicating invalidity, the valid information selecting section 130 does not transfer management information to the transfer determination section 128.

When the CPU 131 writes the management information 41, the valid flag writing section 132 compares the written management information 41 with write source management information stored in either the second storage device 32 or the third storage device 33. When the written management information 41 is the same as the write source management information, the valid flag writing section 132 rewrites the valid flag 127 with a value indicating validity.

Figure 30:
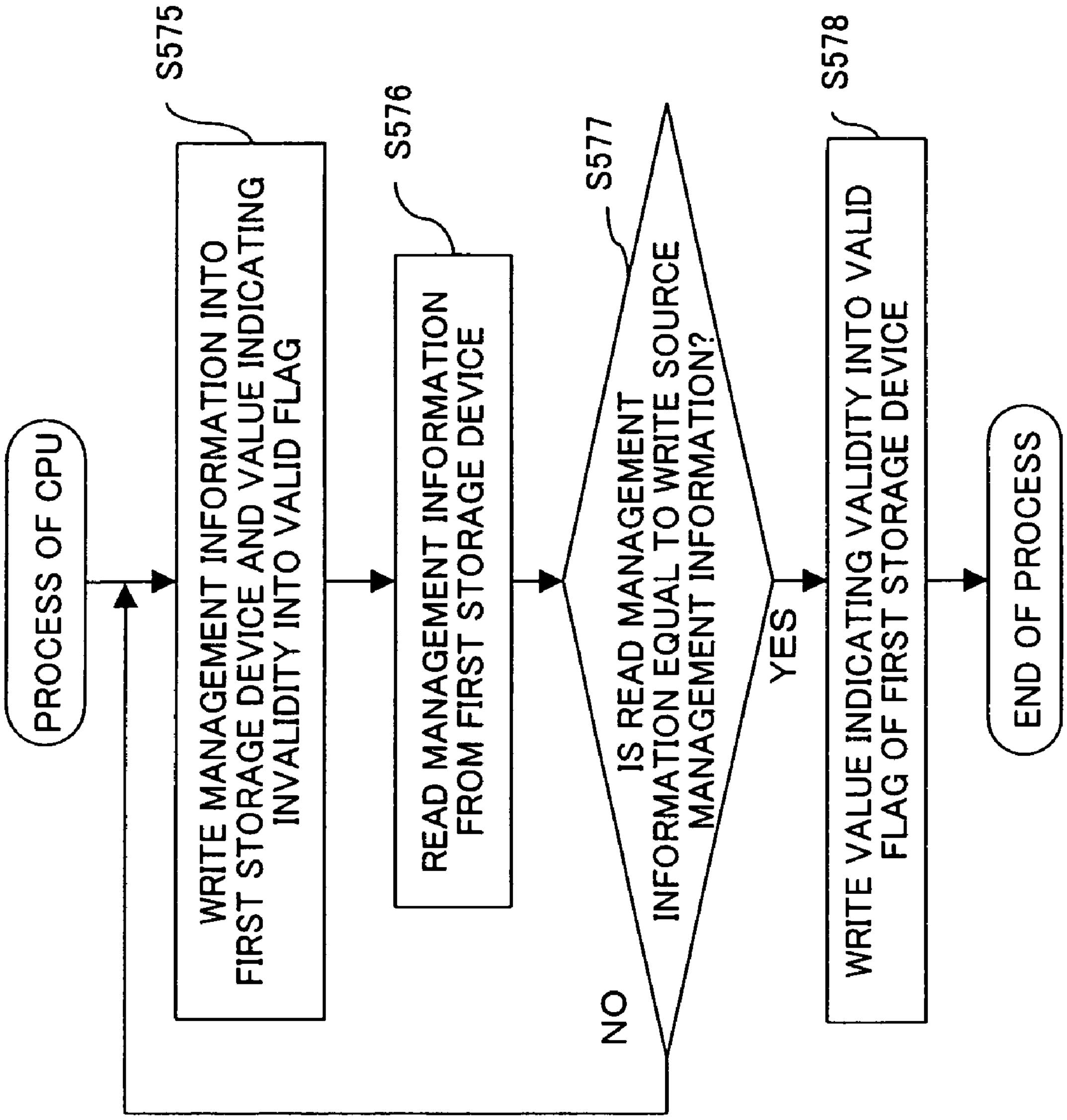
FIG. 30 is a flowchart illustrating an exemplary write operation of management information by a CPU of FIG. 29.

FIG. 30 is a flowchart illustrating an exemplary write operation of management information by the CPU 131. Referring to FIG. 30 in combination with FIG. 29, the CPU 131 writes the write source management information which is prepared in the second storage device 32 or the third storage device 33, into the first storage device 126, and at the same time, a value indicating invalidity into the valid flag 127 (step S575). The value indicating the invalidity of the valid flag 127 is desirably the same value as that which is written when an erase operation is performed in the first storage device 126. In this case, if the CPU 131 erases a content of a destination storage area in the first storage device 126 to which management information is to be written before writing the management information, an operation of the CPU 131 writing a value indicating invalidity as an initial value into the valid flag 127 can be eliminated. Alternatively, in step S575, the CPU 131 may write a value other than the value indicating validity into the valid flag 127 instead of writing the value indicating invalidity.

After writing the management information 41 in step S575, the CPU 131 reads the management information 41 from the first storage device 126 (step S576), and compares the read management information 41 with the write source management information (step S577). When the read management information 41 is the same as the write source management information (YES in step S577), the CPU 131 sets a value indicating validity into the valid flag 127 of the first storage device 126 (step S578), and ends the process. Note that the value indicating the validity of the valid flag 127 is desirably a value other than an erased state of the first storage device 126.

In step S577, when the read management information 41 is not the same as the write source management information (NO in step S577), the CPU 131 returns to step S575 and repeats the above-described process.

With the above-described configuration, the CPU 131 sets the value indicating validity into the valid flag 127 only when the written management information 41 is the same as the write source management information, it can be guaranteed that writing of the management information 41 has been performed with certainty, depending on the content of the valid flag 127.

Although the case where there is one piece of management information has been described in the fourteenth embodiment, even when there are a plurality of pieces of management information, the validity of management information can be similarly improved by providing a valid flag.

Figure 31:
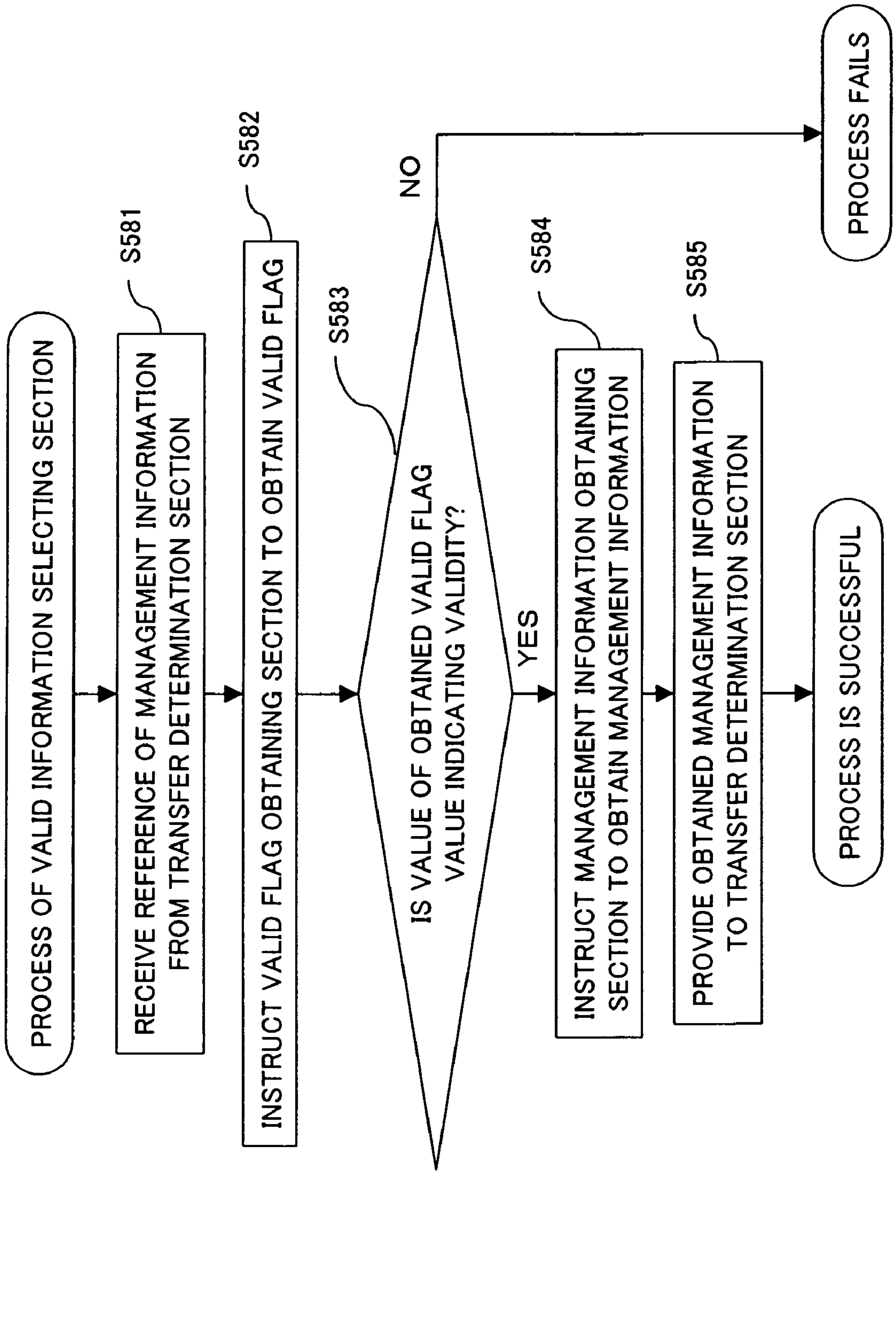
FIG. 31 is a flowchart illustrating an exemplary control process of a valid information selecting section of FIG. 29.

FIG. 31 is a flowchart illustrating an exemplary control process of the valid information selecting section 130. Referring to FIG. 31 in combination with FIG. 29, when the transfer determination section 128 references management information (step S581), the valid information selecting section 130 instructs the valid flag obtaining section 129 to obtain the valid flag 127 (step S582).

Next, the valid information selecting section 130 determines whether or not the obtained valid flag 127 has a value indicating validity (step S583). When the value of the valid flag 127 indicates a value other than the value indicating validity (NO in step S583), since there is not valid management information, the valid information selecting section 130 ends the process (the process fails).

On the other hand, when the value of the obtained valid flag 127 is a value indicating validity (YES in step S583), the valid information selecting section 130 instructs the management information obtaining section 76 to obtain the management information 41 from the first storage device 126 (step S584). Thereafter, the valid information selecting section 130 provides the obtained management information 41 to the transfer determination section 128 (step S585), and ends the process (the process is successful).

Although the case where there is one piece of management information has been described in the fourteenth embodiment, even when there are a plurality of pieces of management information, the valid information selecting section 130 can select valid management information in an almost similar manner. For example, in step S583, when the value of the valid flag 127 is a value other than the value indicating validity, other management information may be obtained and a similar process may be performed.

As described above, in the information processing device 14 of the fourteenth embodiment, valid management information which has been successfully written can be identified with certainty using the valid flag 127, thereby making it possible to secure the reliability of management information when the management information is updated.

Fifteenth Embodiment

Figure 32:
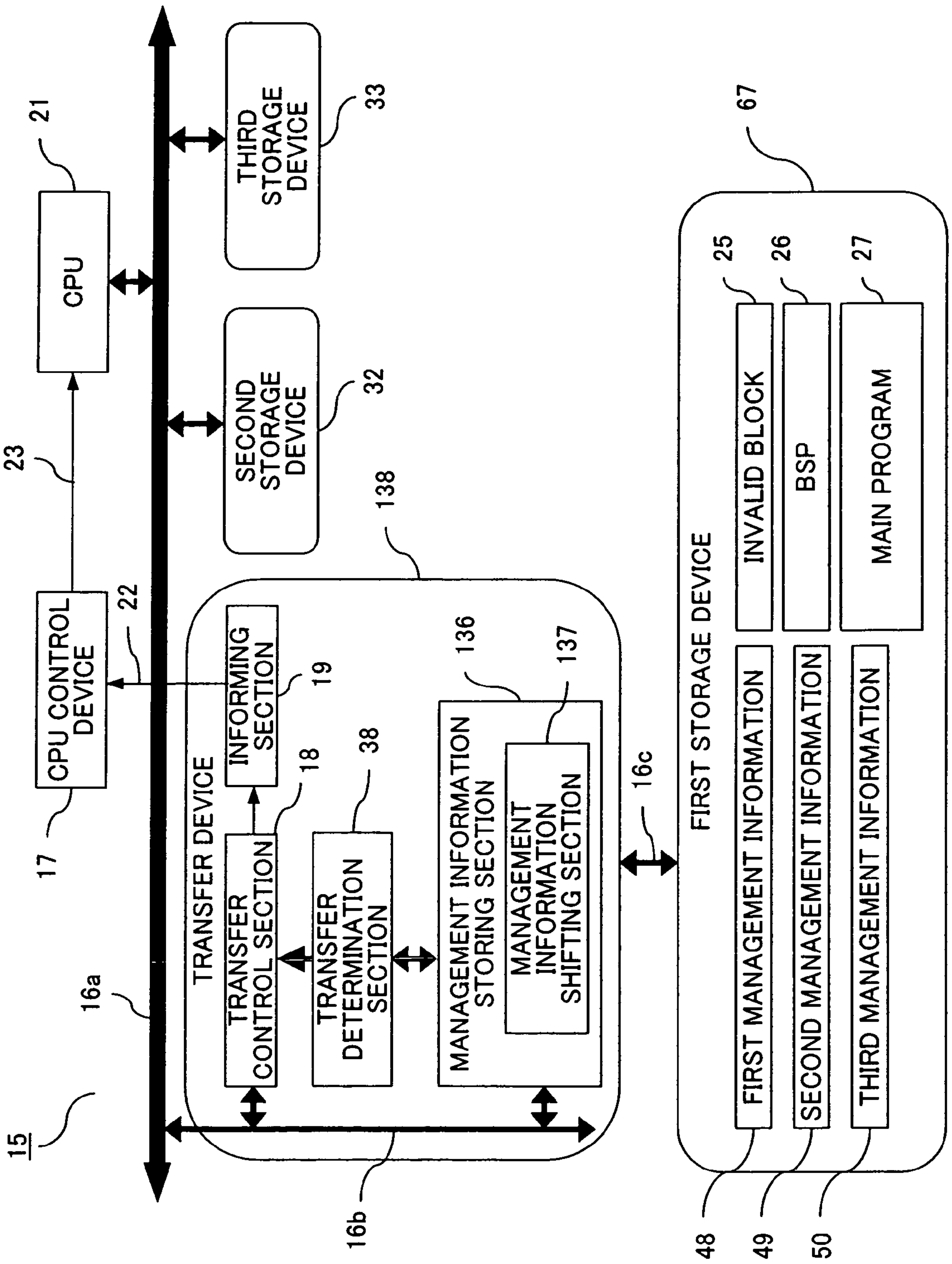
FIG. 32 is a block diagram illustrating a structure of an information processing device according to a fifteenth embodiment of the present invention.

FIG. 32 is a block diagram illustrating a structure of an information processing device according to a fifteenth embodiment of the present invention. The information processing device 15 of the fifteenth embodiment has a basic structure similar to that of the second embodiment (FIG. 7), and is different from that of the second embodiment in that the first storage device 67 includes the first to third management information 48 to 50, and a management information obtaining section 136 further includes a management information shifting section 137.

The first to third management information 48 to 50 hold the same value. Note that the first to third management information 48 to 50 are stored in pages while being cyclic-shifted in units of a byte.

When the transfer determination section 38 requests obtaining of management information, the management information shifting section 137 obtains management information and cyclic-shifts the obtained management information in a direction opposite to that when it was saved by the same shift amount as that when it was saved, and transfers the resultant management information to the transfer determination section 38.

Hereinafter, a failure property of a NAND-type flash memory and the effectiveness of the above-described cyclic shift will be described.

Figure 33A:
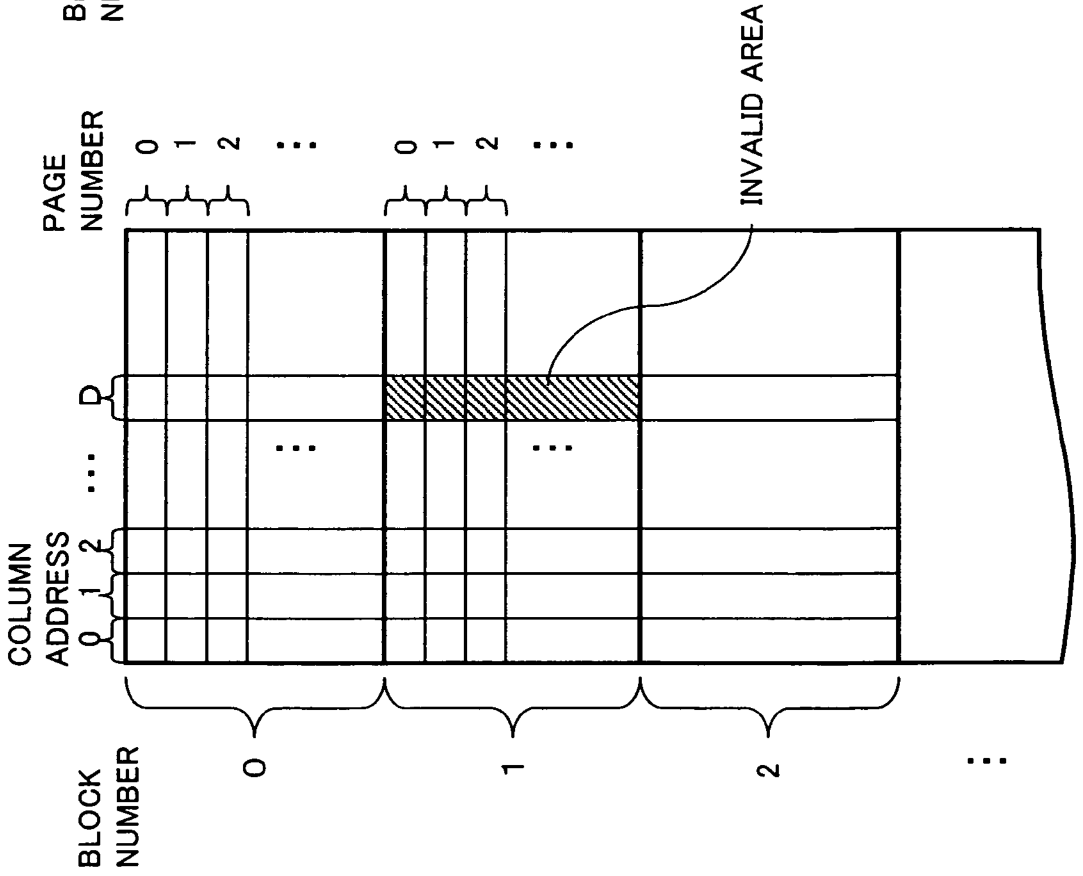
FIG. 33A is a diagram illustrating a failure pattern of a first storage device of FIG. 32.
Figure 33B:
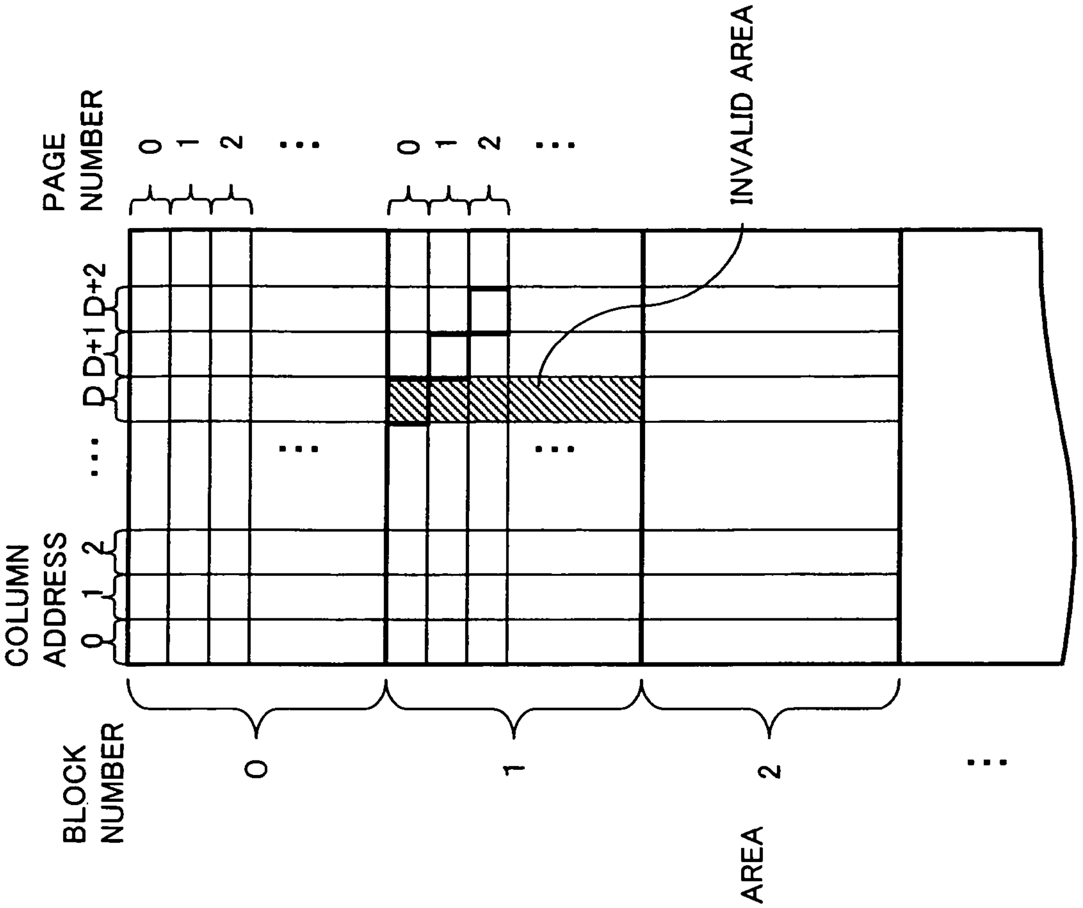
FIG. 33B is a diagram illustrating an example of writing of management information into the first storage device of FIG. 32.

FIG. 33A is a diagram illustrating a failure pattern of the first storage device 67, and FIG. 33B is a diagram illustrating an example of writing of management information. The NAND-type flash memory used in the first storage device 67 structurally has a possibility that, in the same block, storage areas are damaged at addresses in the same column over a plurality of pages. For example, as illustrated with a hatched area of FIG. 33A, in a block number 1, storage areas having the same column address D overcall pages may be damaged. Assuming that such a failure occurs, for example, if a plurality of pieces of management information with respect to one certain block have been written in each page of the block number 1, all of these pieces of data are simultaneously disabled.

Therefore, in the fifteenth embodiment, when the CPU 21 writes the first to third management information 48 to 50 into the first storage device, the CPU 21 writes each of the second management information 49 and the third management information 50 while performing cyclic shift. Specifically, the CPU 21 writes the first management information as it is to the first storage device; cyclic-shifts the second management information by one byte to the right with respect to a write position of the first management information, writes the shifted second management information to the first storage device; and similarly cyclic-shifts the third management information by 2 bytes to the right, and writes the shifted third management information into the first storage device.

For example, referring to FIG. 33B, it is assumed that the CPU writes the first to third management information 48 to 50 into storage areas specified with page numbers 0 to 2 of the block number 1, respectively. In this case, the CPU writes the first management information 48 into an area whose first address is the column address D, cyclic-shifts the second management information 49 by one byte and writes the result into an area whose first address is a column address (D+1), and cyclic-shifts the third management information 50 by 2 bytes and writes the result into an area whose first address is a column address (D+2).

In this case, as illustrated with a hatched area of FIG. 33B, even if storage areas having the column address D break down over all pages in the block number 1, since data values written in the storage areas having the column address D are different from each other, i.e., between each of the first to third management information 48 to 50, the case where the same portions of the first to third management information 48 to 50 are simultaneously disabled can be avoided.

Although the shift amount is increased in units of one byte in the fifteenth embodiment, the shift amount may be increased in units of a value other than one byte. Desirably, the shift amount varies among pieces of management information. More specifically, the shift amount desirably has a value in proportion to a write unit or a page number. For example, the shift amount of each piece of management information may be determined to be (management information number −1)×1 byte, using the number of management information. Further, shift directions when writing and reading management information are desirably fixed in advance. Furthermore, in the fifteenth embodiment, the CPU 21 performs cyclic shift when writing management information. Alternatively, for example, the transfer device may be configured to further include a shift section, and the shift section may perform cyclic shift when writing management information.

Figure 34:
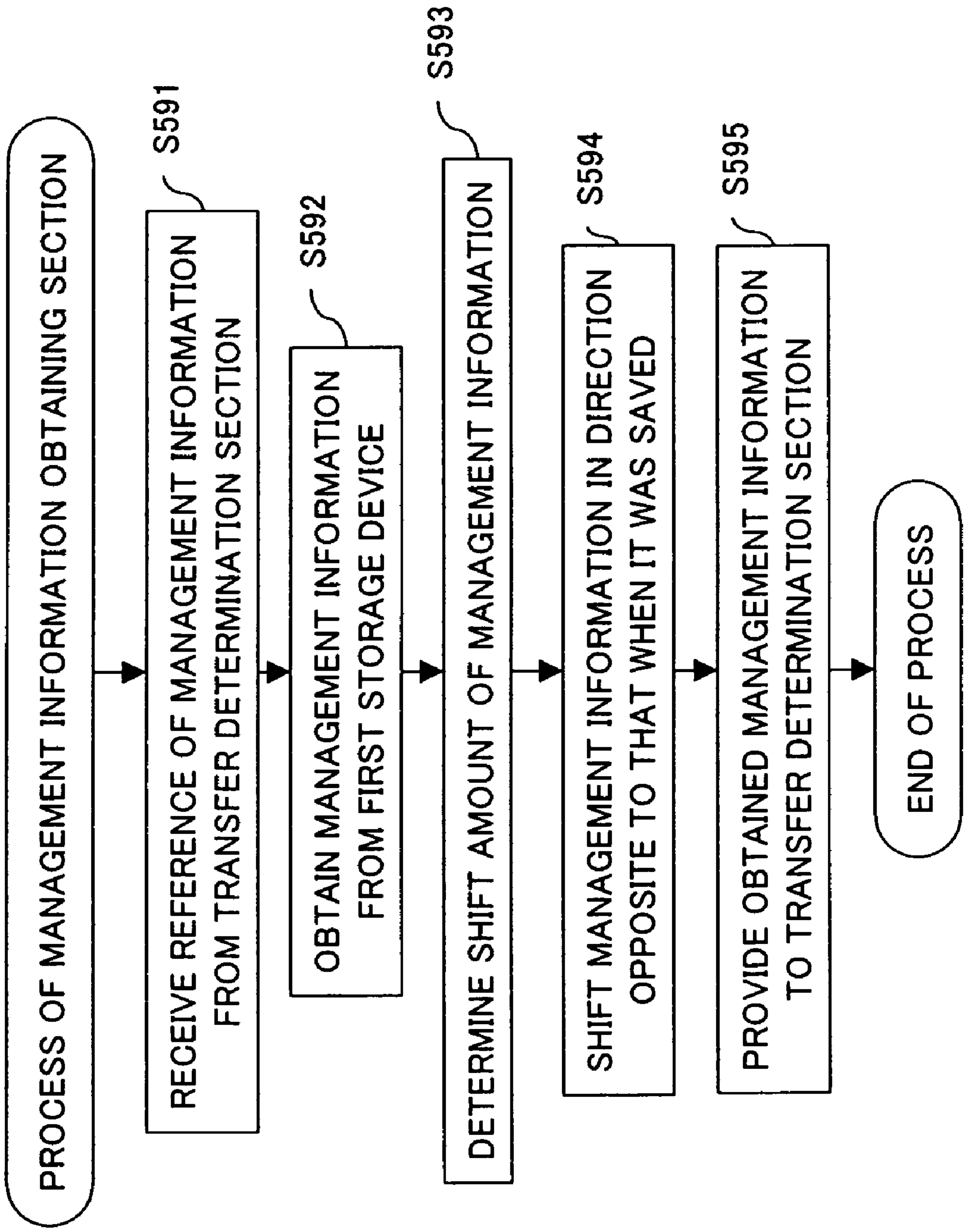
FIG. 34 is a flowchart illustrating an exemplary control process of a management information obtaining section of FIG. 32.

FIG. 34 is a flowchart illustrating an exemplary control process of the management information obtaining section 136. Referring to FIG. 34 in combination with FIG. 32, when the transfer determination section 38 references management information (step S591), the management information obtaining section 136 obtains management information from the first storage device 67 (step S592). Next, the management information obtaining section 136 calculates the shift amount of management information based on a predetermined value or expression (step S593), and the management information shifting section 137 shifts the management information by the calculated shift amount in a direction opposite to that when the management information was saved (step S594). Thereafter, the management information obtaining section 136 provides the shifted management information to the transfer determination section 38 (step S595), and ends the process.

As described above, in the information processing device 15 of the fifteenth embodiment, when the CPU 21 writes management information into the first storage device 67, the CPU 21 cyclic-shifts the management information by a predetermined amount in a predetermined direction on a byte-by-byte basis and writes the result into the first storage device 67. When management information is read, the management information shifting section 137 cyclic-shifts the obtained management information in a direction opposite to the shift direction when writing was performed, by the same shift amount as that when writing was performed. Thereby, in the same block in the first storage device 67, even when storage areas having the same column address over a plurality of pages are destroyed, the case where the same portions of a plurality of pieces of management information are simultaneously disabled can be avoided.

The information processing device and the information processing method of the present invention are characterized in that, whereas an initial program is stored in a storage device including an original invalid block or an acquired invalid block, a system boot can be stably performed. For example, the information processing device and the information processing method of the present invention can be applied to various information processing devices, such as a laptop personal computer, a mobile information device, a mobile telephone, a digital camera, a camcorder, a game device, and the like.

While the invention has been described in detail, the foregoing description is in all aspects illustrative and not restrictive. It is understood that numerous other modifications and variations can be devised without departing from the scope of the invention.

What is claimed is:

1. An information processing device for performing a system boot using a program stored in a non-volatile storage device, comprising:

a first storage device including a valid block and a invalid block, and previously storing a program for performing a system boot in a non-volatile manner;

a second storage device;

a management information storing section, provided in a predetermined valid block of the first storage device, for storing a plurality of pieces of management information indicating a position of the invalid block included in the first storage device in a non-volatile manner, the plurality of pieces of the management information having the same content;

a transfer device for transferring the program from the first storage device to the second storage device based on the stored management information;

a CPU for performing a system boot by executing the program transferred by the second storage device; and a CPU control device for suppressing an operation of the CPU until the program is completely transferred by the transfer device, wherein the transfer device includes:

a management information obtaining section for obtaining the management information; and a transfer determination section for determining whether or not the block storing the program of the first storage device is valid, based on the obtained management information, and the transfer device transfers the program in response to an instruction from the transfer determination section, the management information obtaining section reads the plurality of pieces of the management information in the same order as when the plurality of pieces of the management information were written, the transfer device further includes a generation comparing section for comparing management information which was read at a first time with another piece of management information, determining that the first read management information is latest-generation management information when the first read management information is the same as the other management information, and providing the management information which has been determined to be in a latest generation to the transfer determination section.

2. The information processing device according to claim 1, wherein the transfer device further includes a positional information storing section for storing positional information indicating a storage position of the management information in the first storage device, and the management information obtaining section obtains the management information from the first storage device based on the stored positional information.

3. The information processing device according to claim 2, wherein the positional information stored in the positional information storing section is rewritten by the CPU.

4. The information processing device according to claim 3, wherein the positional information stored in the positional information storing section is updated in association with rewriting of the management information by the CPU.

5. The information processing device according to claim 1, wherein the first storage device stores the plurality of pieces of the management information, and the management information obtaining section obtains one of the plurality of pieces of the management information based on externally input selection information.

6. The information processing device according to claim 5, wherein the transfer device further includes a positional information calculating section for calculating positional information indicating a storage position of the management information in the first storage device based on the selection information.

7. The information processing device according to claim 6, wherein the first storage device stores a plurality of pieces of the same management information, and when one of the plurality of pieces of the same management information is used and a system boot fails, the transfer device transfers the program using another one of the plurality of pieces of the same management information selected based on the selection information.

8. The information processing device according to claim 6, wherein the first storage device stores a plurality of programs different from each other, the plurality of pieces of the management information are provided corresponding to the respective programs, and the transfer device switches the management information based on the selection information.

9. The information processing device according to claim 1, wherein the first storage device stores a plurality of pieces of the management information having the same content, the transfer device includes a majority rule determination section for selecting one of values of the plurality of pieces of the management information based on majority rule for each block, and provides the selected value to the transfer determination section.

10. The information processing device according to claim 9, wherein, when detecting a value possessed by half or more of a total number of the pieces of the management information, the majority rule determination section determines the value as the management information.

11. The information processing device according to claim 1, wherein the first storage device further includes a plurality of update labels composed of a bit sequence, wherein a value different from a previous value is assigned to the update label when the update label is updated, the transfer device further includes an update label obtaining section for updating the update labels in the same order as when the plurality of pieces of the management information were written, and the generation comparing section determines the management information based on the update label.

12. The information processing device according to claim 11, wherein the transfer device further includes an update label storing section for storing the update label used when the management information was updated, as a comparison label, in a non-volatile manner, and the generation comparing section compares the comparison label with the read update label to determine that management information corresponding to an update label having the same value as that of the comparison label is latest-generation management information.

13. The information processing device according to claim 1, wherein the first storage device further includes a management information flag for storing a first value indicating management information and a second value indicating other data, and the generation comparing section further includes a management information flag determining section for determining that the management information is valid when the management information flag indicates the first value, and that the management information is invalid when the management information flag indicates the second value.

14. The information processing device according to claim 12, wherein the first storage device further includes a management information flag for storing a first value indicating management information and a second value indicating other data, when the management information flag indicates the second value, the generation comparing section determines that the management information corresponding to the management information flag is invalid management information, when the management information flag indicates the first value and the update label is the same as the comparison label, the generation comparing section determines that the management information corresponding to the update label is latest-generation management information, and when the management information flag indicates the first value and the update label is different from the comparison label, the generation comparing section determines that the management information corresponding to the update label is previous-generation management information.

15. The information processing device according to claim 1, wherein the transfer device further includes a previous-generation information use informing terminal for informing the outside of a matter that the generation comparing section determines that only the management information in a previous generation can be obtained.

16. The information processing device according to claim 1, wherein, when determining that only the management information in a previous generation can be obtained, the generation comparing section provides the previous-generation management information to the transfer determination section.

17. The information processing device according to claim 1, wherein the transfer device further includes a previous-generation information use storage section for storing a matter that the previous-generation management information was used.

18. The information processing device according to claim 1, wherein the transfer device further includes a mismatch storage section for storing a matter that not all of the plurality of pieces of the management information are the same, when the generation comparing section determines that not all of the plurality of pieces of the management information are the same.

19. The information processing device according to claim 1, wherein the transfer device further includes a mismatch informing terminal for informing the outside of a matter that the generation comparing section determines that not all of the plurality of pieces of the management information are the same.

20. The information processing device according to claim 1, wherein the transfer device further includes a use information storing section for storing information for specifying the management information which was used by the transfer determination section.

21. The information processing device according to claim 1, wherein the transfer device further includes a use information informing terminal for informing the outside of information for specifying the management information which was used by the transfer determination section.

22. The information processing device according to claim 1, wherein the transfer device further includes an information updating section for updating the management information which the generation comparing section determines that is not in a latest generation, among the plurality of pieces of the management information stored in the first storage device, with the management information which was determined to be in a latest generation.

23. The information processing device according to claim 1, wherein the first storage device further stores a valid flag in which a value indicating invalidity is written at the same time as when the management information is written, the CPU further includes a valid flag writing section for reading the written management information after the management information is written, and when the read management information and the written management information are the same, rewriting the valid flag into a valid indicating validity, the transfer device further includes a valid flag obtaining section of reading the valid flag, and the management information obtaining section obtains management information having a value indicating validity in the valid flag.

24. The information processing device according to claim 1, wherein the first storage device stores the management information which is cyclic-shifted by a predetermined amount in a predetermined direction, and the management information obtaining section cyclic-shifts the obtained management information by the predetermined amount in a direction opposite to the predetermined direction, and provides the shifted management information to the transfer determination section.

25. An information processing method for an information processing device comprising a first storage device including a valid block and a invalid block and previously storing a program for performing a system boot in the valid block in a non-volatile manner, a second storage device, management information indicating a position of the invalid block present in the first storage device, and a CPU, the method comprising:

a program transferring step including:

a management information obtaining step of obtaining the management information;

a transfer determination step of determining whether or not the block storing the program of the first storage device is valid, based on the obtained management information, a transfer setting step of setting the valid block of the first storage device as a transfer source of the program based on the management information; and a transferring step of transferring the program from the set transfer source to the second storage device;

a CPU suppressing step of suppressing an operation of the CPU until the program transferring step is completed; and a system boot step in which the CPU executes the program transferred to the second storage device to perform a system boot, wherein a plurality of pieces of the management information having the same content is stored in a predetermined valid block of the first storage device, in the transferring step, the program is transferred based on the determination of the transfer determination step, in the management information obtaining step, the plurality of pieces of the management information is read in the same order as when the plurality of pieces of the management information were written, and the program transferring step further includes a generation comparing step of comparing management information which was read at a first time with another piece of management information, determining that the first read management information is latest-generation management information when the first read management information is the same as the other management information, and providing the management information which has been determined to be in a latest generation to the transfer determination step.

* * * * *